(12) United States Patent
Hinchey et al.

(10) Patent No.: US 7,886,273 B2
(45) Date of Patent: *Feb. 8, 2011

(54) SYSTEMS, METHODS AND APPARATUS FOR GENERATION AND VERIFICATION OF POLICIES IN AUTONOMIC COMPUTING SYSTEMS

(75) Inventors: Michael G. Hinchey, Bowie, MD (US); James L. Rash, Davidsonville, MD (US); Walter F. Truszkowski, Hyattsville, MD (US); Christopher A. Rouff, Beltsville, MD (US); Roy Sterritt, Newtownabbey (GB); Denis Gracanin, Blacksburg, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1089 days.

This patent is subject to a terminal disclaimer.

(21) Appl. No.: 11/532,800

(22) Filed: Sep. 18, 2006

(65) Prior Publication Data

US 2010/0257505 A1 Oct. 7, 2010

Related U.S. Application Data

(60) Provisional application No. 60/748,232, filed on Dec. 1, 2005.

(51) Int. Cl.
*G06F 9/44* (2006.01)
(52) U.S. Cl. ............... 717/124; 717/127; 717/131; 717/136; 717/151; 717/154
(58) Field of Classification Search ............... 714/124
See application file for complete search history.

(56) References Cited

U.S. PATENT DOCUMENTS

| 6,697,965 B1 * | 2/2004 | Shimada ................ 714/38 |
| 7,316,005 B2 * | 1/2008 | Qadeer et al. ........... 717/131 |
| 2002/0100014 A1 * | 7/2002 | Iborra et al. ............ 717/104 |

* cited by examiner

*Primary Examiner*—Thomas K Pham
(74) *Attorney, Agent, or Firm*—Heather Goo

(57) ABSTRACT

Described herein is a method that produces fully (mathematically) tractable development of policies for autonomic systems from requirements through to code generation. This method is illustrated through an example showing how user formulated policies can be translated into a formal mode which can then be converted to code. The requirements-based programming method described provides faster, higher quality development and maintenance of autonomic systems based on user formulation of policies.

Further, the systems, methods and apparatus described herein provide a way of analyzing policies for autonomic systems and facilities the generation of provably correct implementations automatically, which in turn provides reduced development time, reduced testing requirements, guarantees of correctness of the implementation with respect to the policies specified at the outset, and provides a higher degree of confidence that the policies are both complete and reasonable. The ability to specify the policy for the management of a system and then automatically generate an equivalent implementation greatly improves the quality of software, the survivability of future missions, in particular when the system will operate untended in very remote environments, and greatly reduces development lead times and costs.

54 Claims, 25 Drawing Sheets

SYSTEMS, METHODS AND APPARATUS FOR GENERATION AND VERIFICATION OF POLICIES IN AUTONOMIC COMPUTING SYSTEMS

RELATED APPLICATIONS

This application claims the benefit of U.S. Provisional Application Ser. No. 60/748,232 filed Dec. 1, 2005 under 35 U.S.C. 119(e). This application is a continuation-in-part of co-pending U.S. application Ser. No. 11/461,669 filed on Aug. 1, 2006 entitled "Systems, Methods and Apparatus for Procedure Development and Verification," which is a continuation-in-part of co-pending U.S. application Ser. No. 11/203,590 filed Aug. 12, 2005 entitled "Systems, Methods & Apparatus For Implementation Of Formal Specifications Derived From Informal Requirements," which is a continuation-in-part of co-pending U.S. application Ser. No. 10/533,376 filed Feb. 25, 2004 entitled "System and Method for Deriving a Process-based Specification."

ORIGIN OF THE INVENTION

The invention described herein was made by employees of the United States Government and may be manufactured and used by or for the Government of the United States of America for governmental purposes without the payment of any royalties thereon or therefor.

FIELD OF THE INVENTION

This invention relates generally to software development processes and more particularly to validating a system implemented from requirements expressed in policies.

BACKGROUND OF THE INVENTION

High dependability and reliability is a goal of all computer and software systems. Complex systems in general cannot attain high dependability without addressing crucial remaining open issues of software dependability. The need for ultra-high dependability systems increases continually, along with a corresponding increasing need to ensure correctness in system development. Correctness exists where the implemented system is equivalent to the requirements, and where this equivalence can be mathematically proven.

The development of a system may begin with the development of a requirements specification, such as a formal specification or an informal specification. A formal specification might be encoded in a high-level language, whereas requirements in the form of an informal specification can be expressed in restricted natural language, "if-then" rules, graphical notations, English language, programming language representations, flowcharts, scenarios, or even using semi-formal notations such as unified modeling language (UML) use cases.

Natural language scenarios are usually constructed in terms of individual scenarios written in a structured natural language. Different scenarios can be written by different stakeholders of the system, corresponding to the different views the stakeholders have of how the system will perform, including alternative views corresponding to higher or lower levels of abstraction. Natural language scenarios can be generated by a user with or without mechanical or computer aid. The set of natural language scenarios provides the descriptions of actions that occur as the software executes. Some of these actions may be explicit and required, while others can be due to errors arising, or as a result of adapting to changing conditions as the system executes.

For example, if the system involves commanding space satellites, scenarios for that system can include sending commands to the satellites and processing data received in response to the commands. Natural language scenarios might be specific to the technology or application domain to which the natural language scenarios are applied. A fully automated general purpose approach covering all domains is technically prohibitive to implement in a way that is both complete and consistent. To ensure consistency, the domain of application might be purpose-specific. For example, scenarios for satellite systems might not be applicable as policies for systems that manufacture agricultural chemicals.

After completion of an informal specification that represents domain knowledge, the system is developed. A formal specification is not necessarily used by the developer in the development of a system.

In the development of some systems, computer readable code may be generated. The generated code is typically encoded in a computer language, such as a high-level computer language. Examples of such languages include Java, C, C Language Integrated Production System (CLIPS), and Prolog.

One step in creating a system with high dependability and reliability can be verification and validation that the executable system accurately reflects the requirements. Validation of the generated code is sometimes performed through the use of a domain simulator, a very elaborate and costly approach that is computationally intensive. This process of validation via simulation rarely results in an unambiguous result and rarely results in uncontested results among systems analysts. In some examples, a system is validated through parallel mode, shadow mode operations with a human operated system. This approach can be very expensive and exhibit severely limited effectiveness. In some complex systems, this approach leaves vast parts of possible execution paths forever unexplored and unverified.

During the life cycle of a system, requirements typically evolve. Manual change to the system creates a risk of introducing new errors and necessitates retesting and revalidation, which can greatly increase the cost of the system. Often, needed changes are not made due to the cost of verifying/validating consequential changes in the rest of the system. Sometimes, changes are simply made in the code and not reflected in the specification or design, due to the cost or due to the fact that those who generated the original specification or design are no longer available.

Procedures, considered as the essential steps or actions to achieve a result, are used for the assembly of materials in factories, for servicing of spacecraft (whether by astronauts, robots, or a combination), for business operation, and for experiments in a laboratory, to name but a few. Procedures can be very complex, involving many interactions, may involve many actions happening in parallel, and may be subject to significant constraints such as the ordering in which activities must happen, the availability of resources, and so forth. In many complex procedures, it is quite common for human error to result in the entire procedure needing to be repeated ab initio. In some cases, such as servicing a spacecraft, it may not be possible to recover from some of the more serious errors that may occur.

As a rapidly growing field, autonomic systems (autonomic computing and autonomic communications) is a promising new approach for developing large-scale complex distributed' computer-based systems. In autonomic computing, the needs of large scale systems management has been likened to that of the human autonomic nervous system (ANS). The ANS, through the self-regulation, is able to effectively monitor, control and regulate the human body without the need for conscious thought. The self-regulation and separation of concerns provides human beings with the ability to concentrate on high level objectives without having to micro-manage the specific details involved.

The vision and metaphor of autonomic computing is to apply the same principles of self-regulation and complexity-hiding to the design of computer-based systems, in the hope that eventually computer systems can achieve the same level of self-regulation as the human ANS. The majority of conventional systems address the "how" of autonomic systems involving the low-level internal implementation, such as defining autonomic managers that together with the component that is to be managed make up an autonomic element to exist in a collaborative autonomic environment to provide self-management of the system. However, these efforts do not directly address the high-level requirements of the systems that drive autonomic systems.

For the reasons stated above, and for other reasons stated below which will become apparent to those skilled in the art upon reading and understanding the present specification, there is a need in the art to improve the system requirements of autonomic systems. There is also a need in the art for automated, generally applicable ways to produce a system that is a provably correct implementation of policy that is consistent throughout the system and that includes no major discrepancies. There is a further a need for ways to produce a system that does not require use of a theorem-prover and yet provides that policies are consistent throughout the implementation, and that major discrepancies are not inherent in the system. There is a further need for a convenient way of generating a new system when a policy changes. There is also a need for an automated, mathematics-based process for policy validation that does not require large computational facilities.

BRIEF DESCRIPTION OF THE INVENTION

The above-mentioned shortcomings, disadvantages and problems are addressed herein, which will be understood by reading and studying the following discussion.

Systems, methods and apparatus described herein may provide automated analysis, validation, verification, and generation of complex procedures, often implemented as policies. The systems, methods and apparatus may include inferring an equivalent formal model from one or more policies. Such a model can be analyzed for contradictions, conflicts, use of resources before the resources are available, competition for resources, and so forth. From such a formal model, an implementation can be automatically generated in a variety of notations. An implementation may include traditional programming language code, machine language code, scripts, and/or procedures. The approach improves the resulting implementation, which may be provably equivalent to the policies described at the outset. In "reverse engineering" mode, the systems, methods and apparatus can be used to retrieve meaningful descriptions (in English, use cases, graphical notations, or whatever input notations are supported) of existing policies that implement complex procedures, which may solve the need in the prior art to improve the policy of autonomic systems. Moreover, two or more policies can be translated to appropriate formal models, the models may be combined, and the resulting combination checked for conflicts. Then, the combined, error-free model may be used to generate a new (single) policy that combines the functionality of the original separate policies, and may be more likely to be correct.

In one embodiment, systems, methods and apparatus are provided through which one or more policies may be translated without human intervention into a formal specification. In some embodiments, the formal specification is translated to a policy. In some embodiments, the formal specification is analyzed for errors, which, when the corresponding errors are corrected in the given policies, can reduce errors in the subsequently generated formal specification. In some embodiments, the formal specification may be translated back to a policy. The policy can be designed for the assembly and maintenance of devices (whether by human or robots), for business operation, or for experimentation in a laboratory (such as might be used by the bioinformatics community).

In another embodiment, a system may include an inference engine and a translator, the translator being operable to receive policy information and to generate in reference to an inference engine, a formal specification. The system may also include an analyzer operable to perform model verification/checking and determine existence of omissions, deadlock, livelock, and race conditions or other problems and inconsistencies in either the formal specification or the policy information.

In yet other embodiments, a method may include translating requirements expressed informally in a policy statement to a formal specification, and analyzing the formal specification or policy statement.

Systems, clients, servers, methods, and computer-readable media of varying scope are described herein. In addition to the embodiments and advantages described in this summary, further embodiments and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which can be practiced. These embodiments are described in sufficient detail to enable those skilled in the art to practice the embodiments, and it is to be understood that other embodiments can be utilized and that logical, mechanical, electrical and other changes can be made without departing from the scope of the embodiments. The following detailed description is, therefore, not to be taken in a limiting sense.

System Level Overview

Figure 1:
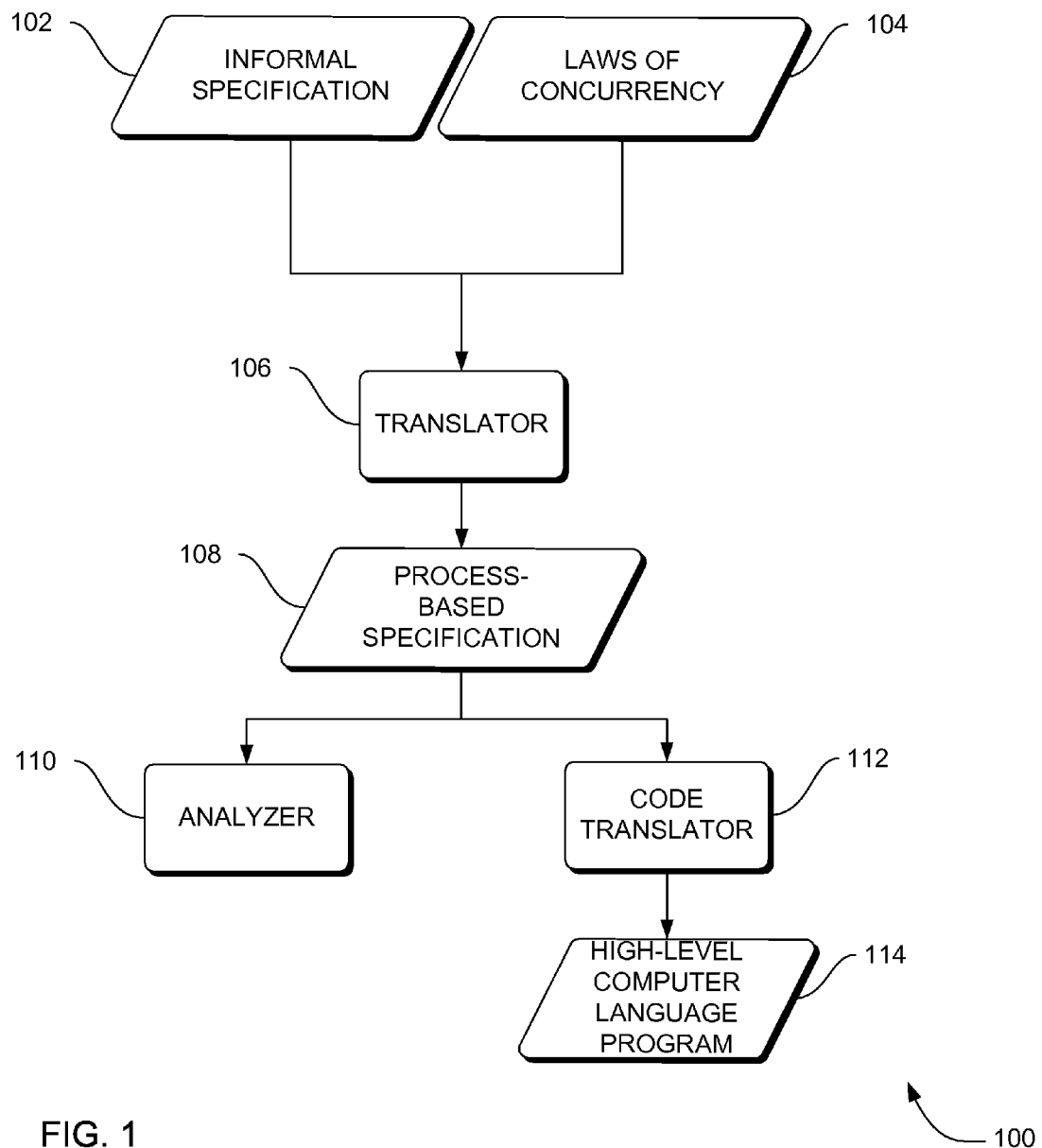
FIG. 1 is a block diagram that provides an overview of a system to generate a high-level computer source code program from an informal specification, according to an embodiment of the invention.
Figure 2:
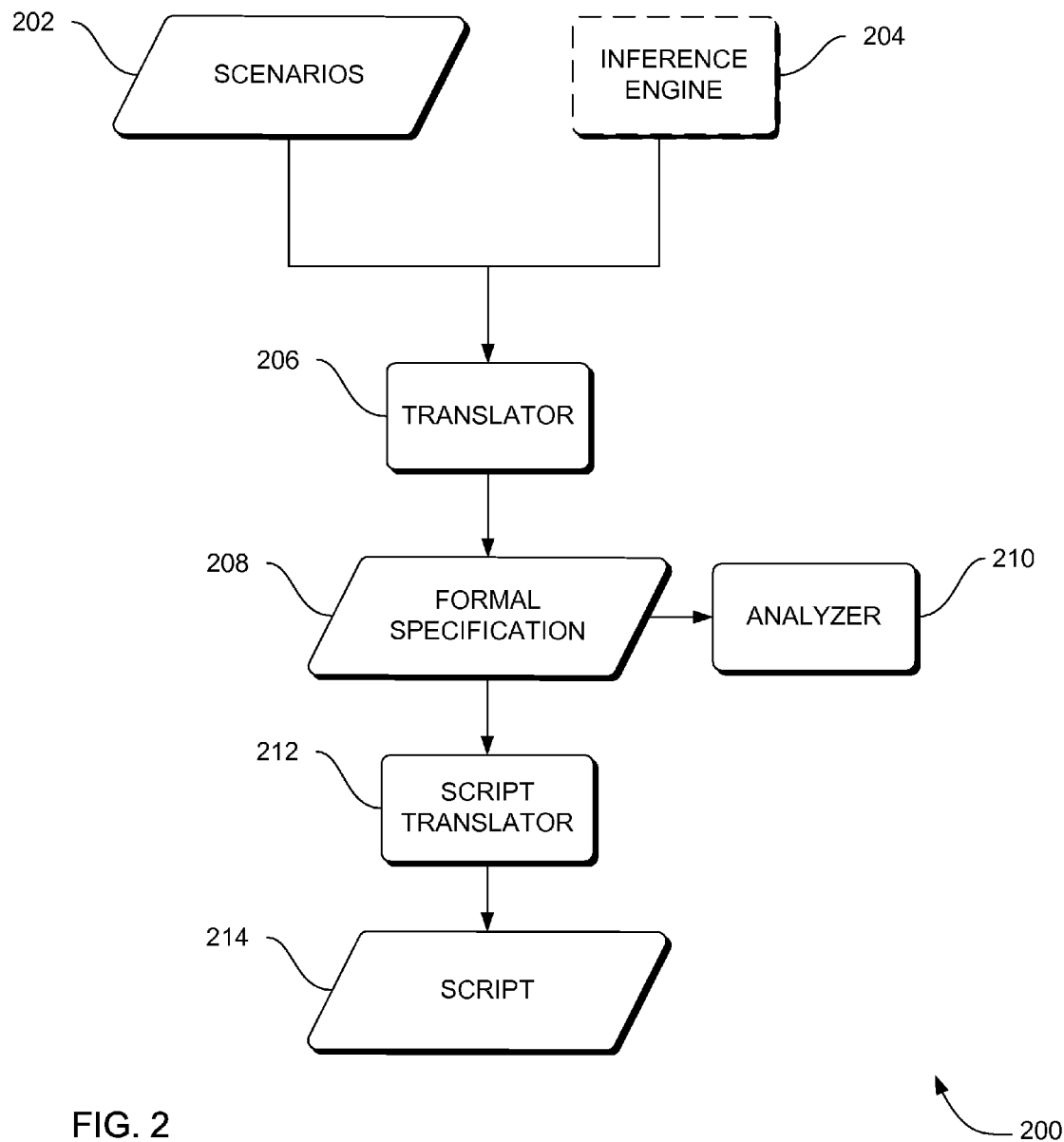
FIG. 2 is a block diagram that provides an overview of a system to engineer a script or procedure from scenarios, according to an embodiment of the invention.
Figure 3:
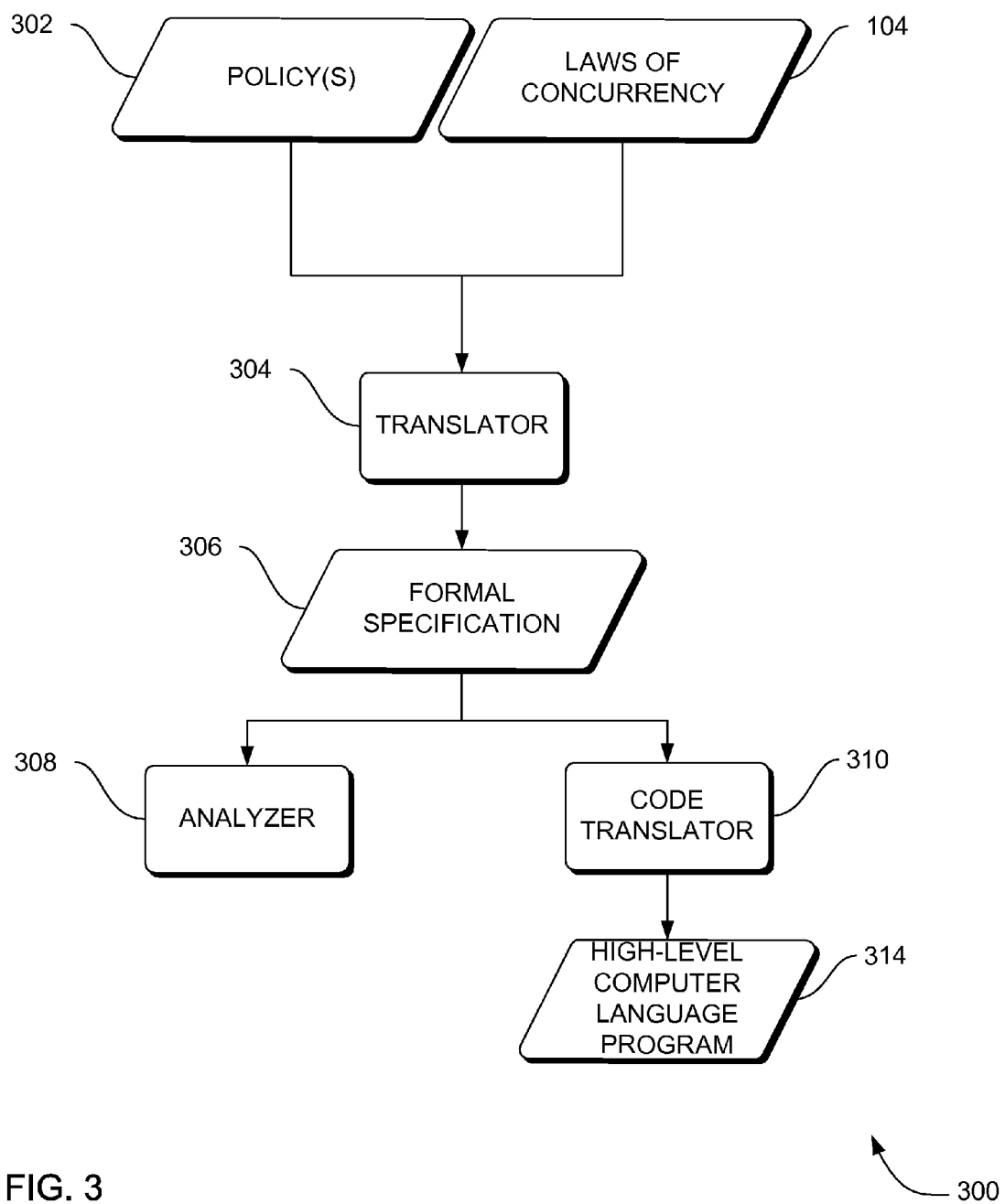
FIG. 3 is a block diagram that provides an overview of a system to generate a high-level computer source code program from a policy, according to an embodiment of the invention.
Figure 4:
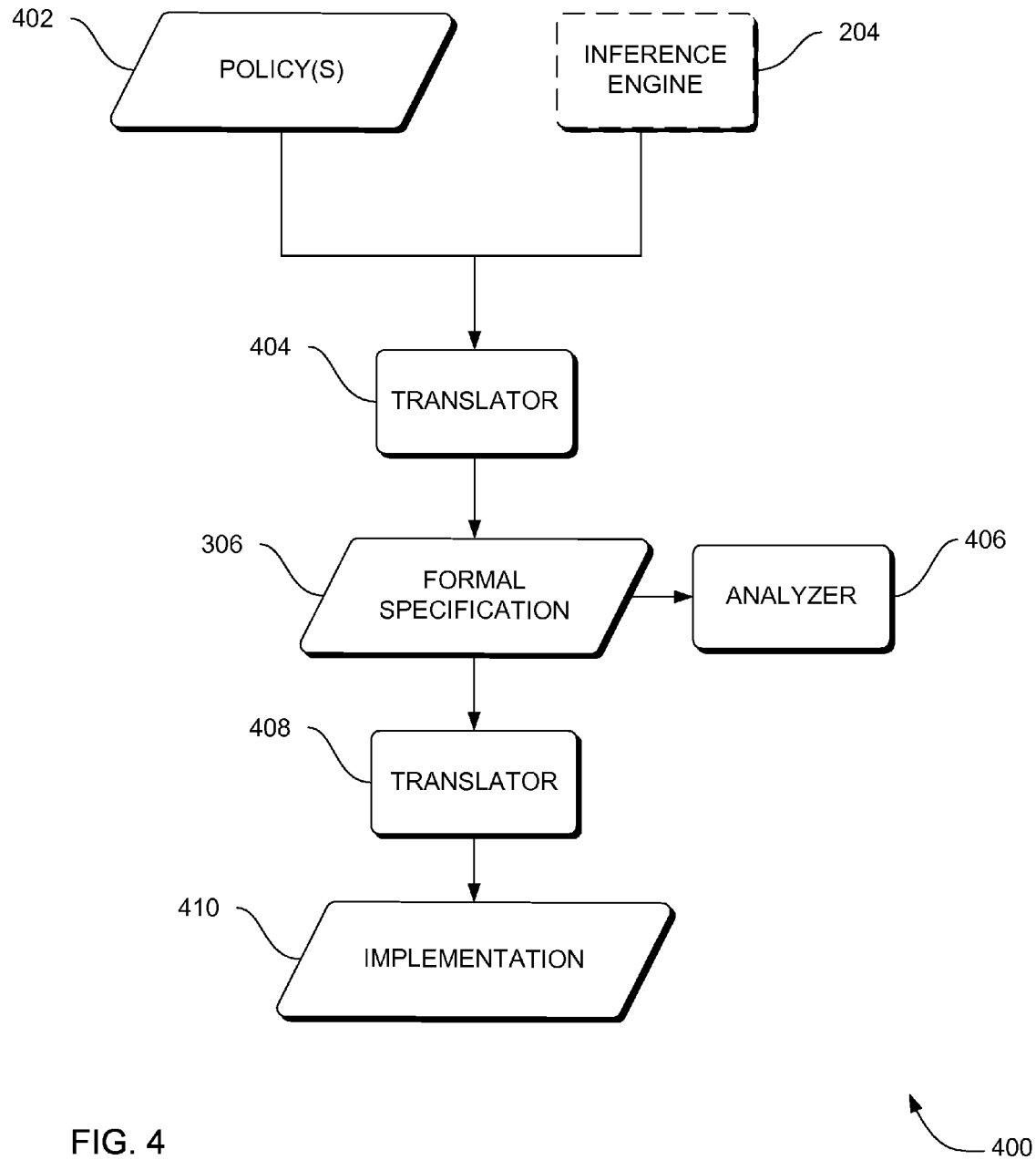
FIG. 4 is a block diagram that provides an overview of a system to engineer an implementation from one of more policies, according to an embodiment of the invention.

FIG. 1 is a block diagram that provides an overview of a system 100 to generate a high-level computer source code program from an informal specification, according to an embodiment. FIG. 2 is a block diagram that provides an overview of a system 200 to generate a formal specification and an implementation from descriptions of a system, according to an embodiment. FIG. 3 is a block diagram that provides an overview of a system to generate a high-level computer source code program from a policy, according to an embodiment. FIG. 4 is a block diagram that provides an overview of a system to engineer a script or procedure from one or more policies, according to an embodiment.

FIG. 1 is a block diagram that provides an overview of a system 100 to generate a high-level computer source code program from an informal specification. System 100 may solve the need in the art for an automated, generally applicable way to produce a system that can be a provably correct implementation of an informal design specification that does not require, in applying the system to any particular problem or application, the use of a theorem-prover.

According to an embodiment, system 100 may be a software development system that includes a data flow and processing points for the data. System 100 may be representative of (i) computer applications and electrical engineering applications such as chip design and other electrical circuit design, (ii) business management applications in areas such as work-flow analysis, (iii) artificial intelligence applications in areas such as knowledge-based systems and agent-based systems, (iv) highly parallel and highly-distributed applications involving computer command and control and computer-based monitoring, and (v) any other area involving process, sequence or algorithm design. According to the disclosed embodiments, system 100 mechanically converts different types of specifications (either natural language scenarios or descriptions which are effectively pre-processed scenarios) into process-based formal specifications on which model checking and other mathematics-based verifications are performed, and then optionally converts the formal specification into code.

In some embodiments, system 100 includes an informal specification 102 having a plurality of rules or requirements. The informal specification can be expressed in restricted natural language, graphical notations, English language, programming language representations, scenarios or even using semi-formal notations such as unified modeling language (UML) use cases. One skilled in the art will recognize that other languages and graphic indicators may exist that fall within the scope of this invention.

A scenario may be natural language text (or a combination of any (possibly graphical) representations of sequential steps or events) that describes the software's actions in response to incoming data and the internal goals of the software. Scenarios also may describe communication protocols between systems and between the components within the systems. Scenarios also may be known as use-cases. A scenario typically describes one or more potential executions of a system, describing what happens in a particular situation, and what range of behaviors is expected from or omitted by the system under various conditions.

According to some embodiments, system 100 also includes a set of laws of concurrency 104. Laws of concurrency 104 are rules detailing equivalences between sets of processes combined in various ways, and/or relating process-based descriptions of systems or system components to equivalent sets of traces. An example of the laws of concurrency 104 is given in "Concurrent Systems: Formal Development in CS by M. G. Hinchey an S. A. Jarvis, McGraw-Hill International Series in Software Engineering, New York and London, 1995, which is herein incorporated by reference in its entirety. Laws of concurrency 104 may be expressed in any suitable language for describing concurrency. These languages may include, but are not limited to, CSP (Communicating Sequential Processes), CCS (Calculus of Communicating Systems) and variants of these languages.

The informal specification 102 and a set of laws of concurrency 104 can be received by a direct mechanical translator 106. The plurality of rules or requirements of the informal specification 102 may be translated mechanically to a process-based specification 108 or other formal specification language representation. The mechanical designation can mean that no manual intervention in the direct translation is provided. In some embodiments, the process-based specification 108 may be an intermediate notation or language of sequential process algebra such as Hoare's language of Communicating Sequential Processes (CSP).

The process-based specification 108 may be mathematically and provably equivalent to the informal specification 102. Mathematically equivalent does not necessarily mean mathematically equal. Mathematical equivalence of A and B means that A implies B and B implies A. Note that applying the laws of concurrency 104 to the process-based specification 108 would allow for the retrieval of a trace-based specification that may be equivalent to the informal specification 102. Note that the process-based specification may be mathematically equivalent to rather than necessarily equal to the original informal specification 108. This indicates that the process may be reversed, allowing for reverse engineering of existing systems, or for iterative development of more complex systems.

In some embodiments, the system includes an analyzer 110 to determine various properties such as existence of omissions, deadlock, livelock, and race conditions in the process-based specification 108.

According to some embodiments, system 100 also includes a code translator 112 to translate the plurality of process-based specification segments 108 to a set of instructions in a high-level computer language program 114, such as the Java language.

System 100 may be operational for a wide variety of informal specification languages and applications, thus system 100 can be generally applicable. Such applications will be apparent to one skilled in the art and may include distributed software systems, sensor networks, robot operation, complex scripts for spacecraft integration and testing, chemical plant operation and control, and autonomous systems.

Some embodiments indicate that system 100 can provide mechanical regeneration of the executable system when requirements dictate a change in the high level specification. In system 100, all that may be required to update the generated application may be a change in the informal specification 102, and then the changes and validation can ripple through in a mechanical process when system 100 operates. This also can allow the possibility of cost effectively developing competing designs for a product and implementing each to determine the best one.

Most notably, in some embodiments, system 100 does not include a theorem prover to infer the process-based specification segments from the informal specification. However, the plurality of process-based specification segments 108 may be provably correct implementations of the informal specification 102, provided the developer of an instance of system 100 has properly used a theorem-prover (not shown) to prove that the direct mechanical translator 106 correctly translates informal specifications into formal specifications.

Figure 17:
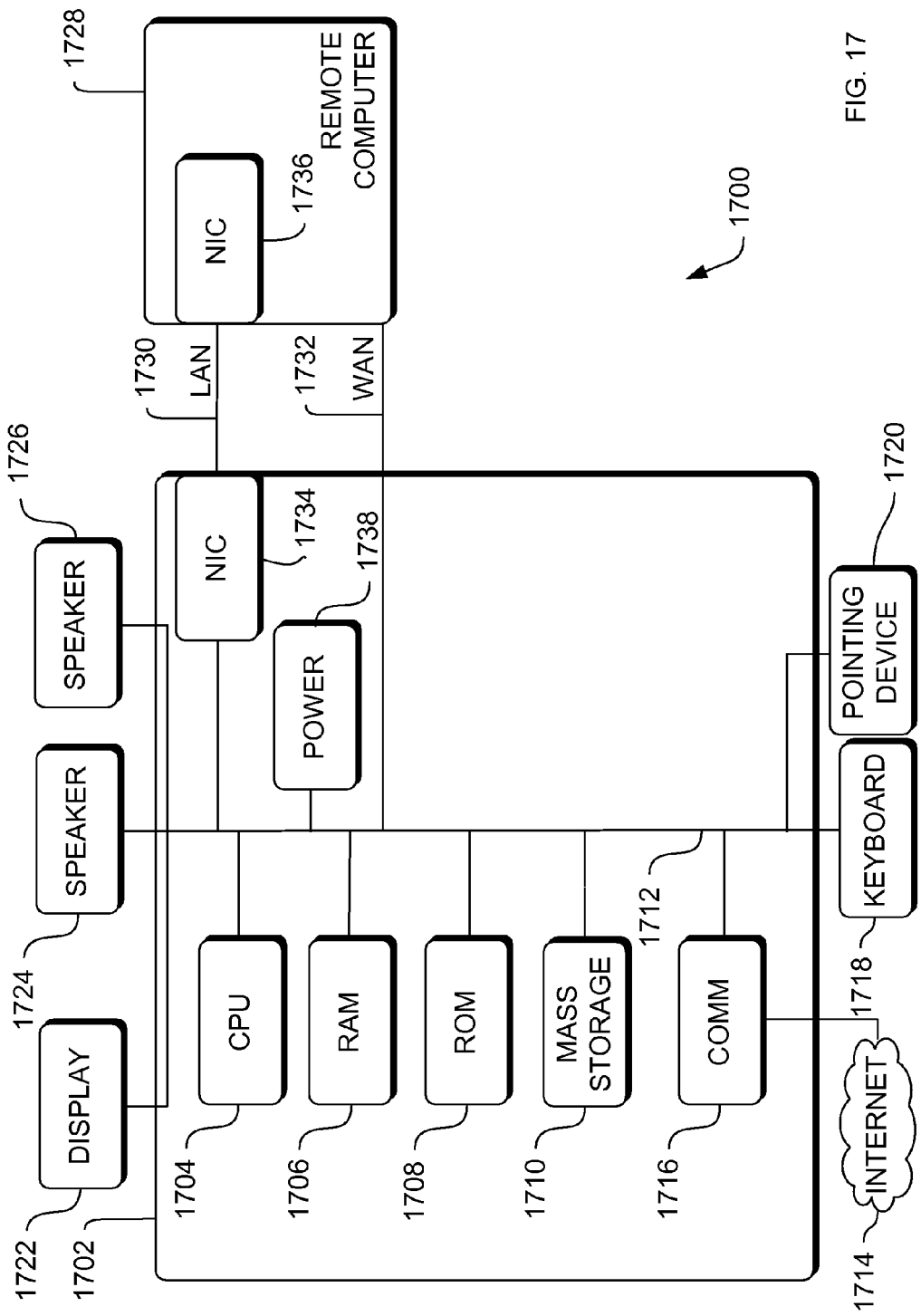
FIG. 17 is a block diagram of the hardware and operating environment in which different embodiments can be practiced, according to an embodiment.

Some embodiments of system 100 operate in a multi-processing, multi-threaded operating environment on a computer, such as computer 1702 in FIG. 17. While the system 100 is not limited to any particular informal specification 102, plurality of rules or requirements, set of laws of concurrency 104, direct mechanical translator 106, process-based specification 108, analyzer 110, code translator 112 and high-level computer language program 114, for sake of clarity a simplified informal specification 102, plurality of rules or requirements, set of laws of concurrency 104, direct mechanical translator 106, process-based specification 108, analyzer 110, code translator 112, and high-level computer language program 114 are described.

System 100 may relate to the fields of chemical or biological process design or mechanical system design, and, generally to any field where the behaviors exhibited by a process to be designed is described by a set of scenarios expressed in natural language, or some appropriate graphical notation or textual notation.

FIG. 2 is a block diagram that provides an overview of a system 200 to engineer a script or procedure from scenarios, according to an embodiment. System 200 may solve the need in the art for an automated, generally applicable way to verify that an implemented script is a provably correct implementation of a set of scenarios.

One embodiment of the system 200 may be a software development system that includes a data flow and processing points for the data. According to some of the disclosed embodiments, system 200 can convert scenarios into a script on which model checking and other mathematics-based verifications can then be performed.

The system 200 can include a plurality of scenarios 202. The scenarios 202 can be written in a particular syntax, such as constrained natural language or graphical representations. The scenarios 202 can embody software applications, although one skilled in the art will recognize that other systems fall within the purview of this invention.

In some embodiments, the scenarios 202 are received by a translator 206. The optional inference engine 204 might be referenced by the translator 206 when the scenarios 202 are translated by the translator 206 into a formal specification 208. Subsequently, the formal specification 208 can be translated by script translator 212 into a script 214 in some appropriate scripting language. In some embodiments no manual intervention in the translation is provided. Those skilled in the art will readily understand that other appropriate notations and/or languages exist that are within the scope of this invention.

In some embodiments, system 200 can include an analyzer 210 to determine various properties of the formal specification, such as the existence of omissions, deadlock, livelock, and race conditions, as well as other conditions, in the formal specification 208, although one skilled in the art will recognize that other additional properties can be determined by the analyzer 210. The analyzer 210 may solve the need in the prior art to reduce errors.

The terms "scripts" and "procedures" can be used interchangeably. Scripts can encompass not only instructions written programming languages (such as Python, awk, etc., as described) but also languages for physical (electro-mechanical) devices and even in constrained natural language instructions or steps or checklists to be carried out by human beings such as, but not limited to, an astronaut.

Scripting languages are computer programming languages initially used only for simple, repeated actions. The name "scripting languages" comes from a written script such as a screenplay, where dialog is repeated verbatim for every performance. Early script languages were often called batch languages or job control languages. A script is typically interpreted rather than compiled, but not always. Scripting languages may also be known as scripting programming languages or script languages.

Many such languages can be quite sophisticated and have been used to write elaborate programs, which are often still called scripts even though the applications of scripts are well beyond automating simple computer tasks. A script language can be found at almost every level of a computer system. Besides being found at the level of the operating system, scripting languages appear in computer games, web applications, word processing documents, network software and more. Scripting languages favor rapid development over efficiency of execution; scripting languages are often implemented with interpreters rather than compilers; and scripting languages are effective in communication with program components written in other languages.

Many scripting languages emerged as tools for executing one-off tasks, particularly in system administration. One way of looking at scripts is as "glue" that puts several components together; thus scripts are widely used for creating graphical user interfaces or executing a series of commands that might otherwise have to be entered interactively through keyboard at the command prompt. The operating system usually offers some type of scripting language by default, widely known as a shell script language.

Scripts are typically stored only in their plain text form (such as ASCII) and interpreted, or compiled each time prior to being invoked.

Some scripting languages are designed for a specific domain, but often it is possible to write more general programs in that language. In many large-scale projects, a scripting language and a lower level programming language are used together, each lending its particular strengths to solve specific problems. Scripting languages are often designed for interactive use, having many commands that can execute individually, and often have very high level operations (for example, in the classic UNIX shell (sh), most operations are programs.

Such high level commands simplify the process of writing code. Programming features such as automatic memory management and bounds checking can be taken for granted. In a 'lower level' or non-scripting language, managing memory and variables and creating data structures tends to consume more programmer effort and lines of code to complete a given task. In some situations this is well worth it for the resulting fine-grained control. The scripter typically has less flexibility to optimize a program for speed or to conserve memory.

For the reasons noted above, it is usually faster to program in a scripting language, and script files are typically much smaller than programs with equivalent functionality in conventional programming languages such as C.

Scripting languages may fall into eight primary categories: Job control languages and shells, macro languages, application-specific languages, web programming languages, text processing languages, general-purpose dynamic languages, extension/embeddable languages, and extension/embeddable languages.

In regards to job control scripting languages and shells, a major class of scripting languages has grown out of the automation of job control—starting and controlling the behavior of system programs. Many of these languages' interpreters double as command-line interfaces, such as the Unix shell or the MS-DOS COMMAND.COM. Others, such as Apple-Script, add scripting capability to computing environments lacking a command-line interface. Examples of job control scripting languages and shells include AppleScript, ARexx (Amiga Rexx), bash, csh, DCL, 4NT, JCL, ksh, MS-DOS batch, Windows PowerShell, RUM sh, and Winbatch In regards to macro scripting languages, with the advent of Graphical user interfaces, a specialized kind of scripting language for controlling a computer evolved. These languages, usually called Macro languages, interact with the same graphic windows, menus, buttons and such that a person does. Macro language scripts are typically used to automate repetitive actions or configure a standard state. Macro language scripts can be used to control any application running on a GUI-based computer, but in practice the support for such languages depend on the application and operating system. Examples of macro scripting languages include AutoHotkey, AutoIt, and Expect.

In regards to application-specific scripting languages, many large application programs include an idiomatic scripting language tailored to the needs of the application user. Likewise, many computer game systems use a custom scripting language to express the programmed actions of non-player characters and the game environment. Languages of this sort are designed for a single application and, while application-specific scripting languages can superficially resemble a specific general-purpose language (e.g. QuakeC, modeled after C) application-specific scripting languages have custom features which distinguish the application-specific scripting languages. Examples of application-specific scripting languages include, Action Code Script, Action-Script, AutoLISP, BlobbieScript [1], Emacs Lisp, HyperTalk, IRC script, Lingo, Cana Embedded Language, mIRC script, NWscript, QuakeC, UnrealScript, Visual Basic for Applications, VBScript, and ZZT-oop.

In regards to web programming scripting languages, an important type of application-specific scripting language is one used to provide custom functionality to internet web pages. Web programming scripting languages are specialized for internet communication and use web browsers for their user interface. However, most modern web programming scripting languages are powerful enough for general-purpose programming. Examples of web programming scripting language include ColdFusion (Application Server), Lasso, Miva, and SMX.

In regards to text processing scripting languages, the processing of text-based records is one of the oldest uses of scripting languages. Many text processing languages, such as Unix's awk and, later, PERL, were originally designed to aid system administrators in automating tasks that involved Unix text-based configuration and log files. PERL is a special case—originally intended as a report-generation language, it has grown into a full-fledged applications language in its own right. Examples of text processing scripting languages include awk, PERL, sed and XSLT.

In regards to general-purpose dynamic scripting languages, some languages, such as PERL, began as scripting languages but developed into programming languages suitable for broader purposes. Other similar languages—frequently interpreted, memory-managed, and dynamic—have been described as "scripting languages" for these similarities, even if general-purpose dynamic scripting languages are more commonly used for applications programming. Examples of general-purpose dynamic scripting languages include APL, Dylan, Groovy, MUMPS (M), newLISP, PERL, PHP, Python, Ruby, Scheme, Smalltalk, SuperCard, and Tool command language (TCL). TCL was created as an extension language but has come to be used more frequently as a general purpose language in roles similar to Python, PERL, and Ruby.

In regards to extension/embeddable languages, a small number of languages have been designed for the purpose of replacing application-specific scripting languages, by being embeddable in application programs. The application programmer (working in C or another systems language) includes "hooks" where the scripting language can control the application. These languages serve the same purpose as application-specific extension languages, but with the advantage of allowing some transfer of skills from application to application. Examples of extension/embeddable script languages include Ch (C/C++ interpreter), ECMAScript a.k.a. DMDScript, JavaScript, JScript, GameMonkeyScript, Guile, ICI, Squirrel, Lua, TCT, and REALbasic Script (RBScript).

JavaScript began as and primarily still is a language for scripting inside of web browsers, however, the standardization of the language as ECMAScript has made JavaScript widely adopted as a general purpose embeddable language.

Other scripting languages include BeanShell (scripting for Java), CobolScript, Escapade (server side scripting), Euphoria, F-Script, Ferite, Groovy, Gui4Cli, Io, KiXtart, Mondrian, Object RUM Pike, Pliant, REBOL, ScriptBasic, Shorthand Language, Simkin, Sleep, StepTalk, and Visual DialogScript.

In some embodiments, the script 214 can be mathematically and provably equivalent to the scenarios 202. Mathematically equivalent does not necessarily mean mathematically equal. Mathematical equivalence of A and B means that A implies B and B implies A. Note that the script 214 of some embodiments can be mathematically equivalent to, rather than necessarily equal to, the scenarios 202.

In some embodiments, the formal specification 208 can be a process-based specification, such as process algebra encoded notation. The process algebra encoded notation is a mathematically notated form. This embodiment can satisfy the need in the art for an automated, mathematics-based process for requirements validation that does not require large computational facilities.

In some embodiments, the scenarios 202 of system 200 can specify allowed situations, events and/or results of a software system. In that sense, the scenarios 202 can provide a very abstract specification of the software system.

Some embodiments of system 200 can be operational for a wide variety of rules, computer instructions, computer languages and applications; thus, system 200 may be generally applicable. Such applications can include, without limitation, space satellite control systems, distributed software systems, sensor networks, robot operations, complex scripts for spacecraft integration and testing, chemical plant operation and control, autonomous systems, electrical engineering applications such as chip design and other electrical circuit design, business management applications in areas such as workflow analysis, artificial intelligence applications in areas such as knowledge-based systems and agent-based systems, highly parallel and highly-distributed applications involving computer command and control and computer-based monitoring, and any other area involving process, sequence or algorithm design. Hence, one skilled in the art will recognize that any number of other applications not listed can fall within the scope of this invention.

Some embodiments of the system 200 can provide mechanical or automatic generation of the script 214, in which human intervention is not required. In at least one embodiment of the system 200, all that is required to update the generated application is a change in the scenarios 202, in which case the changes and validation will ripple through the entire system without human intervention when system 200 operates. This also allows the possibility of cost effectively developing competing designs for a product and implementing each to determine the best one.

Some embodiments of the system 200 may not include an automated logic engine, such as a theorem-prover or an automated deduction engine, to infer the script 214 from the scenarios 202. However, the script 214 can be a provably correct version of the scenarios 202.

Thus, in regards to scripts and complex procedures, automatic code generation of system 200 can generate procedures/scripts in suitable scripting language or device control language (such as for a robot) that would provide the procedures, once validated, to be automatically transformed into an implementation. Additionally, system 200 can be used to "reverse engineer" existing procedures/scripts so that the existing procedures/scripts can be analyzed and corrected and recast in a format and form that can be more easily understood. System 200 also can be used to reverse engineer multiple existing procedures/scripts (even written in different languages) to a single formal model by which the procedures/scripts are combined, analyzed for conflicts, and regenerated as a single procedure/script (in the same or a different procedure/scripting language).

Some embodiments of system 200 operate in a multi-processing, multi-threaded operating environment on a computer, such as the computer 1702 illustrated in FIG. 17. While the system 200 is not limited to any particular scenarios 202, inference engine 204, translator 206, formal specification 208, analyzer 210, script translator 212 and script 214, for sake of clarity, embodiments of simplified scenarios 202, inference engine 204, translator 206, formal specification 208, analyzer 210, script translator 212 and script 214 are described.

In some embodiments, the system 200 may be a software development system that can include a data flow and processing points for the data. System 200 can be representative of (i) computer applications and electrical engineering applications such as chip design and other electrical circuit design, (ii) business management applications in areas such as workflow analysis, (iii) artificial intelligence applications in areas such as knowledge-based systems and agent-based systems, (iv) highly parallel and highly-distributed applications involving computer command and control and computer-based monitoring, and (v) any other area involving process, sequence or algorithm design. One skilled in the art, however, will recognize that other applications can exist that are within the purview of this invention. According to the disclosed embodiments, system 200 can, without human intervention, convert different types of specifications (such as natural language scenarios or descriptions which are effectively pre-processed scenarios) into process-based scripts on which model checking and other mathematics-based verifications are performed, and then optionally convert the script into code.

System 200 can be operational for a wide variety of languages for expressing requirements, thus system 200 may be generally applicable. Such applications may include, without limitation, distributed software systems, sensor networks, robot operation, complex scripts for spacecraft integration and testing, chemical plant operation and control, and autonomous systems. One skilled in the art will understand that these applications are cited by way of example and that other applications can fall within the scope of the invention.

According to some embodiments, a scenario is natural language text (or a combination of any, such as possibly graphical, representations of sequential steps or events) that describes the software's actions in response to incoming data and the internal goals of the software. Scenarios also can describe communication protocols between systems and between the components within the systems. Scenarios also can be known as use cases. A scenario can describe one or more potential executions of a system, such as describing what happens in a particular situation and what range of behaviors is expected from or omitted by the system under various conditions.

Natural language scenarios can be constructed in terms of individual scenarios written in a structured natural language. Different scenarios can be written by different stakeholders of the system, corresponding to the different views the stakeholders can have of how the system will perform, including alternative views corresponding to higher or lower levels of abstraction. Natural language scenarios can be generated by a user with or without mechanical or computer aid. Such a set of natural language scenarios can provide the descriptions of actions that occur as the software executes. Some of these actions can be explicit and required, while others can be due to errors arising or as a result of adapting to changing conditions as the system executes.

For example, if the system involves commanding space satellites, scenarios for that system can include sending commands to the satellites and processing data received in response to the commands. Natural language scenarios may be specific to the technology or application domain to which the natural language scenarios are applied. A fully automated general purpose approach covering all domains can be technically prohibitive to implement in a way that is both complete and consistent.

To ensure consistency, the domain of application can often be purpose-specific. For example, scenarios for satellite systems may not be applicable as scenarios for systems that manufacture agricultural chemicals.

System 300 may solve the need in the art for an automated, generally applicable way to produce a system that is a provably correct implementation of one or more policies that does not require, in applying the system to any particular problem or application, the use of a theorem-prover.

In some embodiments, system 300 is a software development system that includes a data flow and processing points for the data. System 300 thus may be representative of (i) computer applications and electrical engineering applications such as chip design and other electrical circuit design (ii) business management applications in areas such as workflow analysis, (iii) artificial intelligence applications in areas such as knowledge-based systems and agent-based systems, (iv) highly parallel and highly-distributed applications involving computer command and control and computer-based monitoring, (v) any other area involving process, sequence or algorithm design, (vi) remote space vehicles such as autonomous nanotechnology swarm (ANTS) and moon and Mars exploration vehicles. According to some of the disclosed embodiments, system 300 mechanically converts different types of specifications (either natural language scenarios or descriptions which are effectively pre-processed scenarios) into formal specifications on which model checking and other mathematics-based verifications are performed, and then optionally converts the formal specification into code.

System 300 may include one or more policies 302 having a plurality of rules or requirements. The policy 302 can be an informal specification that can be expressed in restricted natural language, graphical notations, English language, programming language representations, or even using semi-formal notations such as unified modeling language (UML) use cases.

In some embodiments, policies are a set of business considerations or a business policy that is designed to guide decisions of courses of action, and policy-based management may be viewed as an administrative approach to systems management that establishes rules in advance to deal with situations that are likely to occur. From this perspective, policy-based management works by controlling access to, and setting priorities for, the use of information and communications technology (ICT) resources, for instance, where a (human) manager can simply specify the business objectives and the system will make it so in terms of the needed ICT. For example:

1. "The customer database must be backed up nightly between 1 a.m. and 4 a.m."

2. "Platinum customers are to receive no worse than 1-second average response time on all purchase transactions."

3. "Only management and the HR senior staff can access personnel records." and

4. "The number of connections requested by the Web application server cannot exceed the number of connections supported by the associated database."

These examples highlight the wide range and multiple level(s) of policies available, the first being concerned with system protection through backup, the second being concerned with system optimization to achieve and maintain a level of quality of service for key customers; while the third and forth examples are concerned with system configuration and protection. If one definition of autonomic computing could be self-management based on high level guidance from humans, and considering IBM's high-level set of self-properties (self-CHOP: configuration, healing, optimization and protection) against the types of typical policies mentioned previously (optimization, configuration and protection), the importance and relevance of polices for achieving autonomicity become clear.

Some application areas of policy-based management (PBM) may include networking as a way of managing IP-based multi-service networks with quality of service guarantees, the telecom industry for next generation networking which is driven by the fact that policy has been recognized as a solution to manage complexity and to guide the behavior of a network or distributed system through high-level user-oriented abstractions, and product and system management by providing uniform cross-product policy definition and management infrastructure.

System 300 may also include a set of laws of concurrency 104. According to some embodiments, the policy 302 and a set of laws of concurrency 104 are received by a direct mechanical translator 304. The plurality of rules or requirements of the policy 302 may be translated mechanically to a formal specification 306 or other formal specification language representation, such as a process-based specification. The mechanical characterization means that no manual intervention in the direct translation is provided. In some embodiments, the formal specification 306 is an intermediate notation or language of sequential process algebra such as Hoare's language of Communicating Sequential Processes (CSP).

The formal specification 306 can be mathematically and provably equivalent to the policy 302. Mathematically equivalent does not necessarily mean mathematically equal. Mathematical equivalence of A and B means that A implies B and B implies A. Note that applying the laws of concurrency 104 to the formal specification 306 would allow for the retrieval of a trace-based specification that is equivalent to the policy 302. Note that the formal specification 306 could be mathematically equivalent to rather than necessarily equal to the original policy 302. Thus, in some embodiments, the process may be reversed, allowing for reverse engineering of existing systems, or for iterative development of more complex systems.

In some embodiments, the system includes an analyzer 308 to determine various properties such as existence of omissions, deadlock, livelock, and race conditions in the formal specification 306.

System 300 may also include a code translator 310 to translate the plurality of formal specification segments 306 to a set of instructions in a high-level computer language program 314, such as the Java language.

System 300 can be operational for a wide variety of policy languages and applications, thus system 300 can be generally applicable. Such applications may include distributed software systems, sensor networks, robot operation, complex scripts for spacecraft integration and testing, chemical plant operation and control, and autonomous systems.

In some embodiments, system 300 provides mechanical regeneration of the executable system when requirements dictate a change in the high level specification. In system 300, updating the generated application may require a change in the policy 302, and then the changes and validation can ripple through in a mechanical process when system 300 operates. This also allows the possibility of cost effectively developing competing designs for a product and implementing each to determine the best one.

Most notably, some embodiments of system 300 do not include a theorem-prover to infer the formal specification 306 segments from the policy 302. However, the plurality of formal specification segments 306 can be provably correct implementations of the policy 302, provided the developer of an instance of system 300 has properly used a theorem-prover (not shown) to prove that the direct mechanical translator 304 correctly translates policies into formal specifications.

Some embodiments of system 300 operate in a multi-processing, multi-threaded operating environment on a computer, such as computer 1702 in FIG. 17. While the system 300 may not be limited to any particular policy 302, plurality of rules or requirements, set of laws of concurrency 104, direct mechanical translator 304, formal specification 306, analyzer 308, code translator 310 and high-level computer language program 314, for sake of clarity a simplified policy 302, plurality of rules or requirements, set of laws of concurrency 104, direct mechanical translator 304, formal specification 306, analyzer 308, code translator 310, and high-level computer language program 314 are described by way of example.

According to some embodiments, system 300 relates to the fields of chemical or biological process design or mechanical system design, and, generally to any field where the behaviors exhibited by a process to be designed are described or constrained by a set of policies expressed in natural language, or some appropriate graphical notation or textual notation.

FIG. 4 is a block diagram that provides an overview of a system to generate or engineer a script or procedure from policies, according to an embodiment. System 400 can alleviate a need in the art for an automated, generally applicable way to verify that an implementation is a provably correct implementation of one of more policies.

At least one embodiment of the system 400 is a software development system that includes a data flow and processing points for the data. According to the disclosed embodiments, system 400 can convert one or more policies into a script on which model checking and other mathematics-based verifications can then be performed.

The system 400 can include one or more policies 402. The policies 402 can be written in a particular syntax, such as constrained natural language, graphical representations, etc. The policies 402 can embody software applications, although one skilled in the art will recognize that other systems fall within the purview of this invention.

In some embodiments, the policies 402 are received by a translator 404. The optional inference engine 204 might be referenced by the translator 404 when the policies 402 are translated by the translator 404 into a formal specification 306. Subsequently, the formal specification 306 can be translated by translator 408 into a script in some appropriate scripting language. In some embodiments, no manual intervention in the translation is provided. Those skilled in the art readily will understand that other appropriate notations and/or languages exist that are within the scope of this invention.

In some embodiments, system 400 can include an analyzer 406 to determine various properties of the formal specification, such as the existence of omissions, deadlock, livelock, and race conditions, as well as other conditions, in the formal specification 306, although one skilled in the art will recognize that other additional properties can be determined by the analyzer 406. The analyzer 406 may solve the need in the prior art to reduce errors.

In some embodiments, the implementation 410 can be mathematically and provably equivalent to the policies 402. Mathematically equivalent does not necessarily mean mathematically equal. Mathematical equivalence of A and B means that A implies B and B implies A. Note that the implementation 212 of some embodiments may be mathematically equivalent to, rather than necessarily equal to, the policies 402.

In some embodiments, the formal specification 306 can be a process-based specification, such as process algebra encoded notation. The process algebra encoded notation can be a mathematically notated form. This embodiment can satisfy the need in the art for an automated, mathematics-based process for policy validation that does not require large computational facilities.

In some embodiments, the policies 402 of system 400 can specify allowed situations, events and/or results of a software system. In that sense, the policies 402 can provide a very abstract specification of the software system.

Some embodiments of system 400 can be operational for a wide variety of rules, computer instructions, computer languages and applications; thus, system 400 can be generally applicable. Such applications can include, without limitation, space satellite control systems, distributed software systems, sensor networks, robot operations, complex scripts for spacecraft integration and testing, chemical plant operation and control, autonomous systems, electrical engineering applications such as chip design and other electrical circuit design, business management applications in areas such as workflow analysis, artificial intelligence applications in areas such as knowledge-based systems and agent-based systems, highly parallel and highly-distributed applications involving computer command and control and computer-based monitoring, and any other area involving process, sequence or algorithm design. Hence, one skilled in the art will recognize that any number of other applications not listed can fall within the scope of this invention.

Some embodiments of the system 400 can provide mechanical or automatic generation of the implementation 410, in which human intervention is not required. In at least one embodiment of the system 400, all that is required to update the generated application is a change in the policies 402, in which case the changes and validation will ripple through the entire system without human intervention when system 400 operates. This also allows the possibility of cost effectively developing competing designs for a product and implementing each to determine the best one.

Perhaps most notably, some embodiments of the system 400 do not include an automated logic engine, such as a theorem-prover or an automated deduction engine, to infer the script implementation from the policies 402. However, the script implementation can be a provably correct version of the policies 402 provided the developer of an instance of system 400 has properly used a theorem-prover (not shown) to prove that the direct mechanical translator 404 correctly translates policies into formal specifications.

Thus, in regards to scripts and complex procedures, automatic code generation of system 400 can generate procedures/scripts in suitable scripting language or device control language (such as for a robot) that would provide the procedures, once validated, to be automatically transformed into an implementation. Additionally, system 400 can be used to "reverse engineer" existing procedures/scripts so that the existing procedures/scripts can be analyzed and corrected and recast in a format and form that can be more easily understood. System 400 also can be used to reverse engineer multiple existing procedures/scripts (even written in different languages) to a single formal model by which the procedures/scripts are combined, analyzed for conflicts, and regenerated as a single procedure/script (in the same or a different procedure/scripting language).

Some embodiments of system 400 operate in a multi-processing, multi-threaded operating environment on a computer, such as the computer 1702 illustrated in FIG. 17. While the system 400 is not limited to any particular policies 402, inference engine 204, translator 404, formal specification 306, analyzer 406, translator 408 and implementation 212, for sake of clarity, embodiments of simplified policies 402, inference engine 204, translator 404, formal specification 306, analyzer 406, translator 408 and implementation 212 are described by way of example.

In some embodiments, the system 400 is a software development system that can include a data flow and processing points for the data. System 400 can be representative of (i) computer applications and electrical engineering applications such as chip design and other electrical circuit design, (ii) business management applications in areas such as workflow analysis, (iii) artificial intelligence applications in areas such as knowledge-based systems and agent-based systems, (iv) highly parallel and highly-distributed applications involving computer command and control and computer-based monitoring, and (v) any other area involving process, sequence or algorithm design. One skilled in the art, however, will recognize that other applications can exist that are within the purview of this invention. According to the some of disclosed embodiments, system 400 can, without human intervention, convert different types of policies into formal specifications on which model checking and other mathematics-based verifications are performed, and then optionally convert the specification into code.

System 400 can be operational for a wide variety of languages for expressing requirements, thus system 400 can be generally applicable. Such applications may include, without limitation, distributed software systems, sensor networks, robot operation, complex scripts for spacecraft integration and testing, chemical plant operation and control, and autonomous systems. One skilled in the art will understand that these applications are cited by way of example and that other applications can fall within the scope of the invention.

According to some embodiments, a policy can describe one or more potential executions of a system, such as describing what happens in a particular situation and what range of behaviors is expected from or omitted by the system under various conditions.

Different policies can be written by different stakeholders of the system, corresponding to the different views the stakeholders can have of how the system will perform, including alternative views corresponding to higher or lower levels of abstraction. Policies can be generated by a user with or without mechanical or computer aid. Policies can provide the descriptions of actions that occur as the software executes. Some of these actions can be explicit and required, while others can be due to errors arising, including those that are as a result of adapting to changing conditions as the system executes.

Method Embodiments

In the previous section, a system level overview of the operation of an embodiment is described. In this section, some particular methods of such embodiments are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware may also be composed of computer-executable instructions. Methods 500-1600 can be performed by a program executing on, or performed by, firmware or hardware that is a part of, a computer, such as computer 1702 in FIG. 17.

Figure 5:
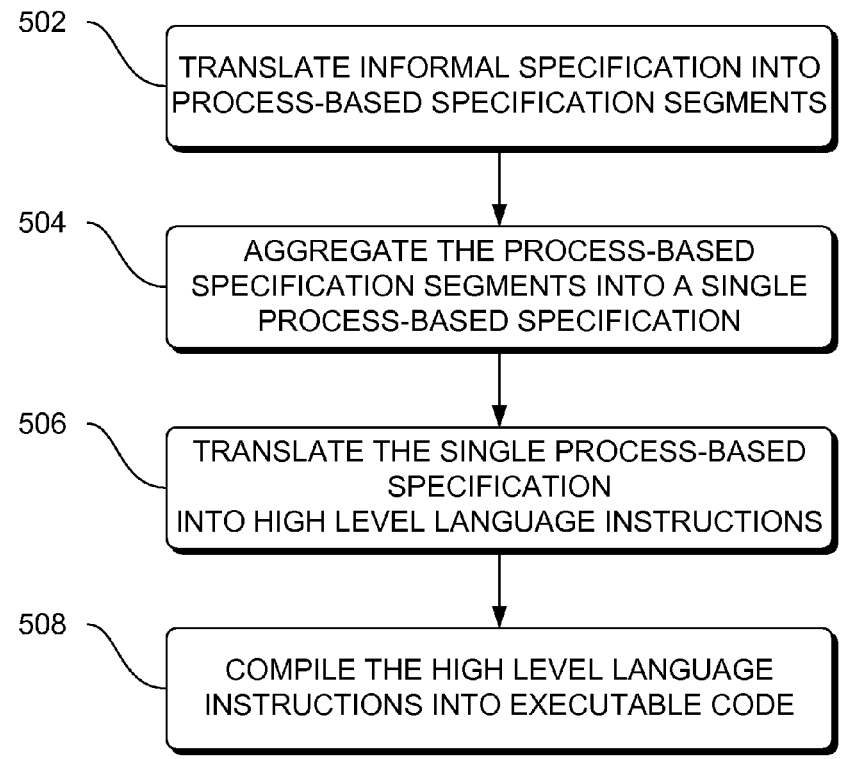
FIG. 5 is a flowchart of a method to generate an executable system from an informal specification, according to an embodiment.

FIG. 5 is a flowchart of a method 500 to generate an executable system from an informal specification, according to an embodiment. Method 500 may solve the need in the art to generate executable computer instructions from requirements with neither the time involved in manually writing the executable computer instructions, nor the mistakes that may arise in manually writing the executable computer instructions, without using a theorem-prover.

Figure 6:
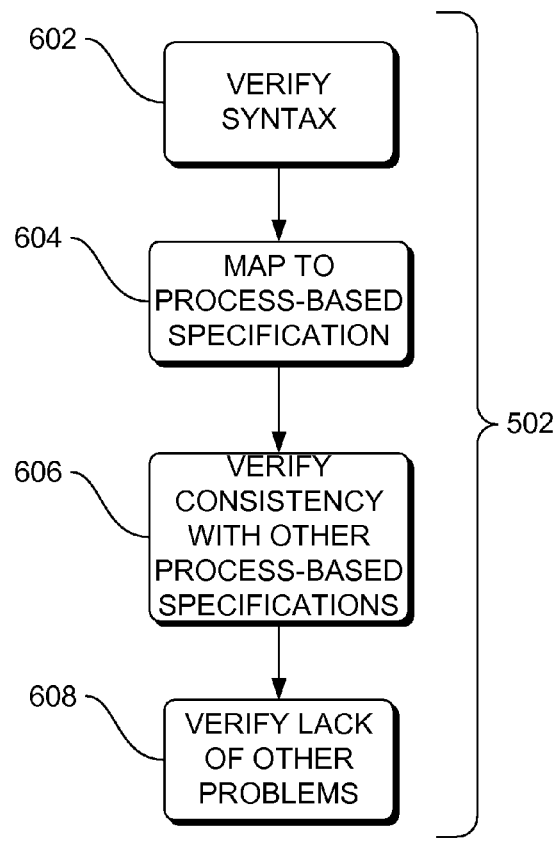
FIG. 6 is a flowchart of a method to translate mechanically each of a plurality of requirements of the informal specification to a plurality of process-based specification segments, according to an embodiment.

Method 500 may include translating 502 mechanically each of a plurality of requirements of the informal specification to a plurality of process-based specification segments. In some embodiments, the translating 502 includes inferring the process-based specification segments from the informal specification. One embodiment of translating 502 is shown in FIG. 6 below.

In some embodiments, the process-based specification is process algebra notation. Such embodiments may satisfy the need in the art for an automated, mathematics-based process for requirements validation that does not require large computational facilities.

Thereafter, some embodiments of method 500 include aggregating 504 the plurality of process-based specification segments into a single process-based specification model.

Subsequently, method 500 may include translating 506 the single process-based specification model to instructions encoded in the Java computer language or some other high-level computer programming language. Thereafter, method 500 may include compiling 508 the instructions encoded in the Java computer language into a file of executable instructions.

In some embodiments, method 500 includes invoking the executable instructions, which can provide a method to convert informal specifications to an application system without involvement from a computer programmer.

Some embodiments of method 500 do not include invoking a theorem-prover to infer the process-based specification segments from the informal specification.

FIG. 6 is a flowchart of a method 600 to translate mechanically each of a plurality of requirements of the informal specification to a plurality of process-based specification segments, according to an embodiment. Method 600 is an example of one embodiment of translating 502 in FIG. 5.

According to some embodiments, method 600 includes verifying 602 the syntax of the plurality of requirements of the informal specification. Thereafter, method 600 may include mapping 604 the plurality of requirements of the informal specification to a process-based specification.

In some embodiments, method 600 subsequently also includes verifying 606 consistency of the process-based specification with at least one other process-based specification. In some embodiments, method 600 subsequently also includes verifying 608 lack of other problems in the process-based specification. One example of other problems is unreachable states in the process defined in the process-based specification.

Figure 7:
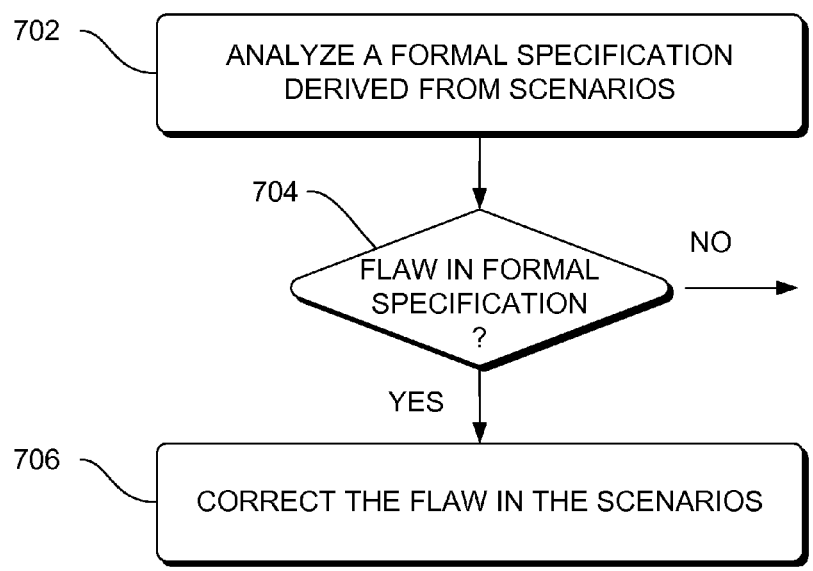
FIG. 7 is a flowchart of a method to verify the syntax of a set of scenarios, translate the set of scenarios to a formal specification, verify the consistency of the formal specification, and verify the absence of other problems, according to an embodiment.

FIG. 7 is a flowchart of a method 700 to validate/update a system, according to an embodiment. Method 700 may solve the need in the prior art to reduce errors in scripts.

Method 700 can include analyzing 702 a script or specification, such as script 214, of the system 200, the script having been previously derived from the rules of the system.

Thereafter, a determination 704 can be made as to whether or not the analyzing 702 indicates that the script contains a flaw. If a flaw does exist, then the rules can be corrected 706 accordingly.

In some embodiments, the analyzing 702 can include applying mathematical logic to the script in order to identify a presence or absence of mathematical properties of the script. Mathematical properties of the script that can be determined by applying mathematical logic to the script can include, by way of example:

1) whether or not the script implies a system execution trace that includes a deadlock condition, and 2) whether or not the script implies a system execution trace that includes a livelock condition.

In some embodiments, the above two properties are domain independent. One skilled in the art will note that there are many other possible flaws that could be detected through the analysis of the model, many or even most of which might be domain dependent. An example of a domain dependent property would be represented by the operational principle that "closing a door that is not open is not a valid action." This example would be applicable in the domain of the Hubble Space Telescope on-orbit repair.

Because in some embodiments the script can be provably equivalent to the scenarios by virtue of method 700, if a flaw is detected in the script, then the flaw could be corrected by changing (correcting) the scenarios. Once the correction is made, then the corrected scenarios can be processed by system 200 in FIG. 2 or method 800 in FIG. 8 to derive a new script from the corrected scenarios. According to at least one embodiment, the new script can be processed by method 700, and the iterations of method 800 and method 700 can repeat until there are no more flaws in the script generated from the scenarios, at which point the scenarios have no flaws because the script is provably equivalent to the scenarios from which it was derived. Thus, iterations of methods 800 and 700 can provide verification/validation of the scenarios.

Thereafter, the new script can be used to generate an implementation of the system.

Figure 8:
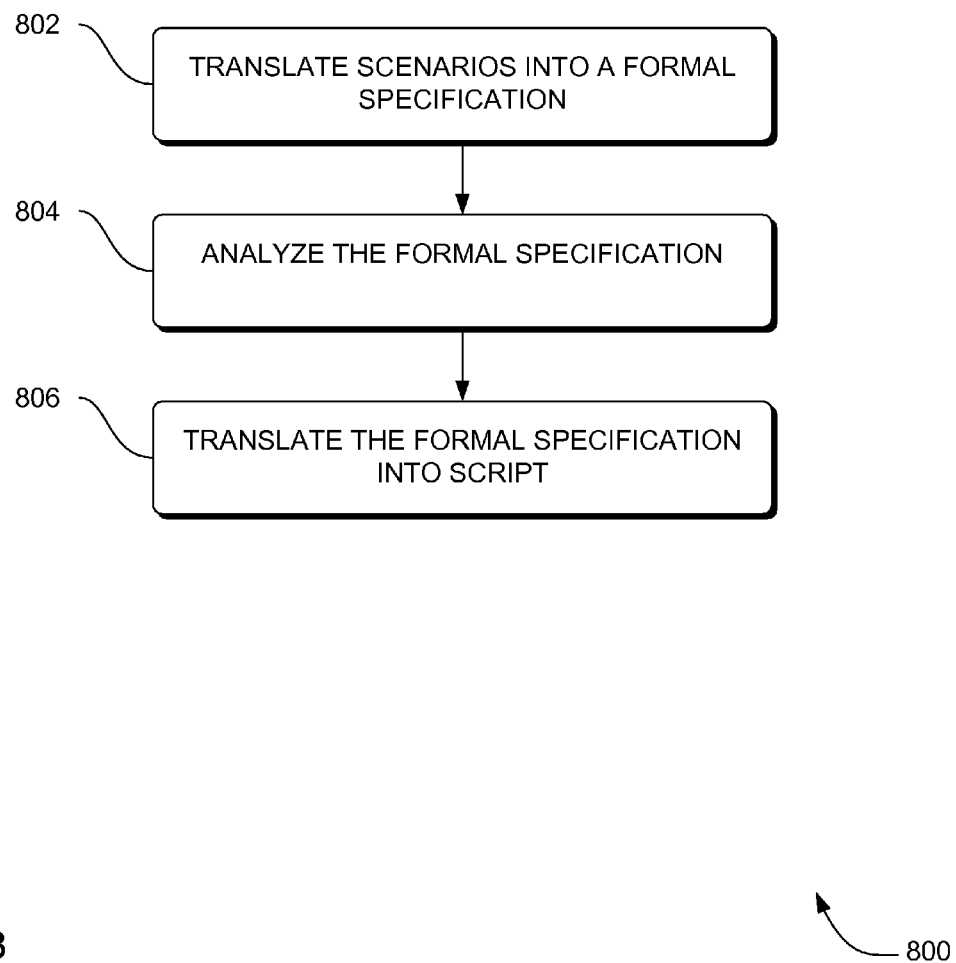
FIG. 8 is a flowchart of a method to validate/update scenarios of a system, according to an embodiment.

FIG. 8 is a flowchart of a method to validate/update scenarios of a system, according to an embodiment. Embodiments of the method 800 can include translating 802 scenarios 202 into a script 214 without human intervention.

Thereafter, method 800 can include optionally analyzing 804 the formal model or specification. The analyzing 804 can be a verification/validation of the scenarios 202. In some embodiments, the analyzing 804 determines various properties such as existence of omissions, deadlock, livelock, and race conditions in the script 214, although one skilled in the art will know that analyzing the formal specification can determine other properties not specifically listed, which are contemplated by this invention. In some embodiments, the analyzing 804 can provide a mathematically sound analysis of the scenarios 202 in a general format that doesn't require significant understanding of the specific rules of the scenarios 202. Further, the analyzing 804 can warn developers of errors in their scenarios 202, such as contradictions and inconsistencies, but equally importantly it can highlight rules or sets of rules that are underspecified or over-specified and need to be corrected for the scenarios 202 to operate as intended. Thus, in some embodiments no knowledge of the scenarios 202 is required, but instead significant analysis, verification, testing, simulation and model checking of the scenarios 202 using customized tools or existing tools and techniques is provided.

Thereafter, in some embodiments, method 800 can include translating 806 the formal specification to a script 214. Thus, in at least one embodiment, the method 800 provides a method to convert scenarios to scripts without involvement from a computer programmer.

Most notably, some embodiments of the method 800 do not include invoking an automated logic engine, such as a theorem-prover, to infer the script 214 from the scenarios 202.

In certain embodiments of method 800, informal representations of requirements for procedures/scripts that represent the operation of a system can be mechanically converted to a mathematically sound specification that can be analyzed for defects and used for various transformations including automatic translation into executable form and automatic regeneration of procedures/scripts into other notations/representations. In other embodiments, the method disclosed herein can be used to automatically reverse engineer existing procedures and scripts to formal models from which the method can be used to produce customer-readable representations of procedures/scripts or machine-processable scripts in any of various scripting languages.

Mathematically sound techniques can be used to mechanically translate an informal procedure/script requirement into an equivalent formal model. The model may be mechanically (that is, with no manual intervention) manipulated, examined, analyzed, verified, and used in a simulation.

Figure 9:
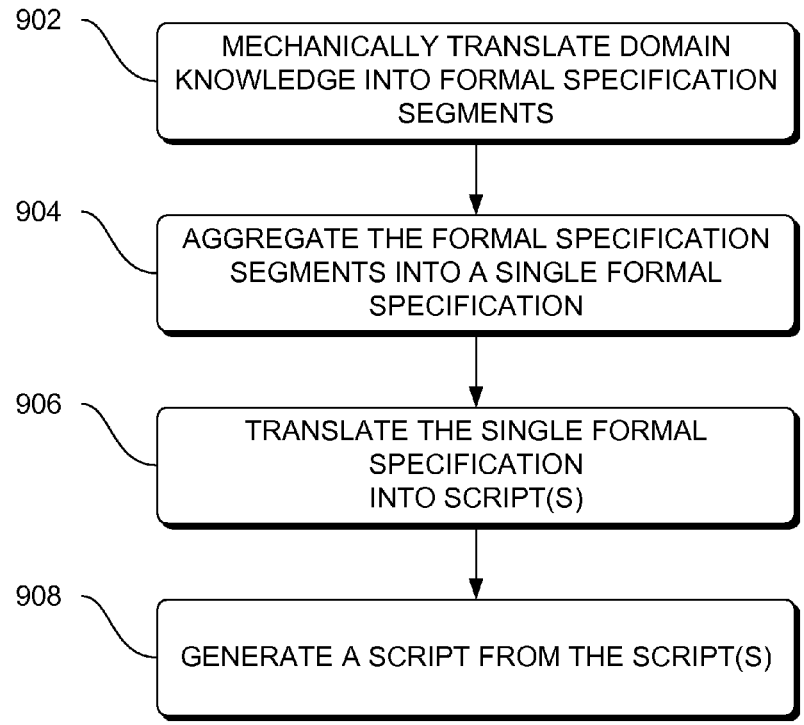
FIG. 9 is a flowchart of a method to translate each of a plurality of requirements into a script, according to an embodiment.

FIG. 9 is a flowchart of a method 900 to translate each of a plurality of requirements to a plurality of formal specification segments, and formally compose the plurality of formal specification segments into a single equivalent specification, and translate the single formal specification into a script, according to an embodiment. Method 900 may solve the need in the art to generate scripts from requirements with neither the time involved in manually writing the scripts, nor the mistakes that can arise in manually writing the scenarios, without using an automated logic engine.

Figure 10:
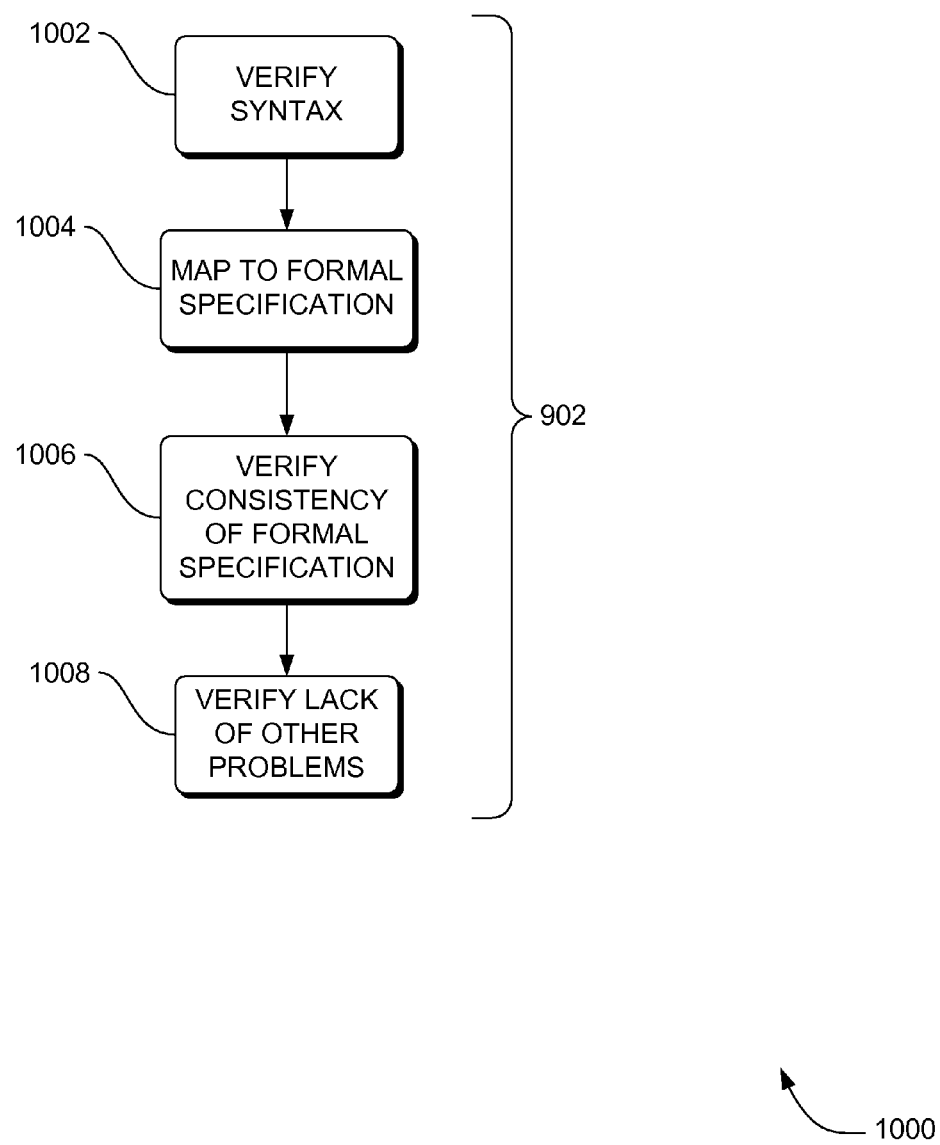
FIG. 10 is a flowchart of a method to generate a formal specification from scenarios, according to an embodiment.

Method 900 can include mechanically translating 902 each of a plurality of scenarios or domain knowledge to a plurality of formal specification segments. The translation can be done without human intervention. One embodiment of translating 902 is shown in FIG. 10 below.

Thereafter, method 900 can include aggregating 904 the plurality of formal specification segments into a single formal model or specification.

Subsequently, method 900 can include translating 906 the single formal specification to multiple scripts as output from translating 906. Thereafter, method 900 can include generating 908 a script from the scripts that were accepted from translating 906. Thus, method 900 provides an embodiment of a method to convert a script to an application system without involvement from a computer programmer.

Most notably, method 900 does not include invoking a theorem-prover or any other automated logic engine to infer the formal specification segments from the scenarios.

FIG. 10 is a flowchart of a method 1000 to verify the syntax of a set of scenarios, translate the set of scenarios to a formal specification, verify the consistency of the formal specification, and verify the absence of other problems, according to an embodiment. Method 800 is an example of one embodiment of translating 902 in FIG. 9. As indicated, such translation can be accomplished without human intervention.

In some embodiments, the method 1000 can include verifying 1002 the syntax of the plurality of scenarios. Thereafter, method 1000 can include mapping 1004 the plurality of scenarios to a script or specification.

In some embodiments, method 1000 subsequently can also include verifying 1006 consistency of the formal specification. In some embodiments, method 1000 subsequently also includes verifying 1008 a lack of other problems in the formal specification. One example of other problems is unreachable states in the process defined in the formal specification, although one skilled in the art will understand that yet other problems are contemplated.

In some embodiments, methods 500-1600 can be implemented as a computer data signal embodied in a carrier wave that represents a sequence of instructions, which, when executed by a processor, such as processor 1704 in FIG. 17, cause the processor to perform the respective method. In other embodiments, methods 500-1600 can be implemented as a computer-accessible medium having executable instructions capable of directing a processor, such as processor 1704 in FIG. 17, to perform the respective method. In varying embodiments, the medium can be a magnetic medium, an electronic medium, an electromagnetic medium, a medium involving configurations or spatial positioning of electrons, ions, atoms, or molecules or aggregations of such particles, a medium involving quantum mechanical entities, or an optical medium. Other mediums will be readily apparent to one skilled in the art and fall within the scope of this invention.

Figure 11:
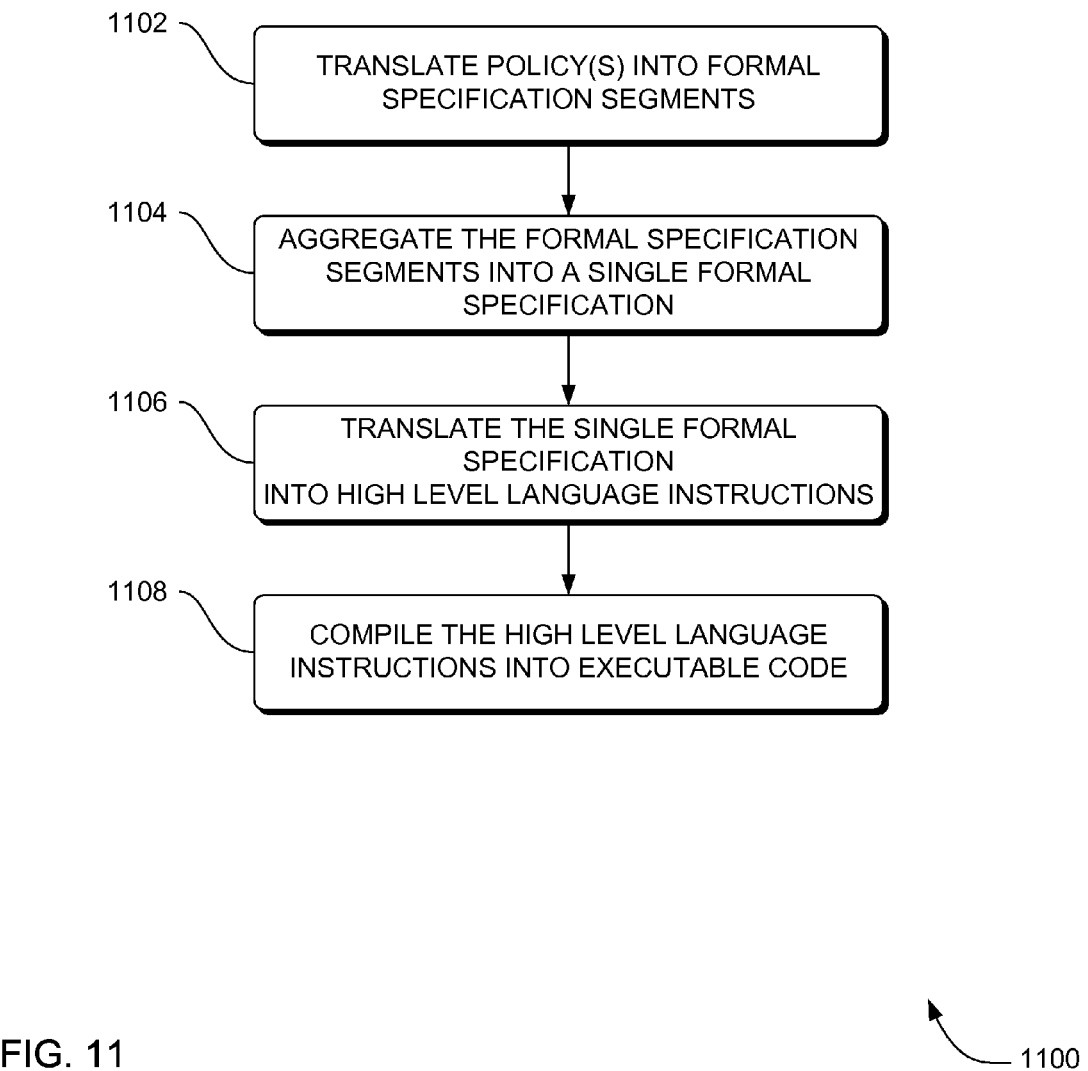
FIG. 11 is a flowchart of a method to generate an executable system from a policy, according to an embodiment.

FIG. 11 is a flowchart of a method 1100 to generate an executable system from a policy, according to an embodiment. Method 1100 solves the need in the art to generate executable computer instructions from policy with neither the time involved in manually writing the executable computer instructions, nor the mistakes that may arise in manually writing the executable computer instructions, without using a theorem-prover.

Figure 12:
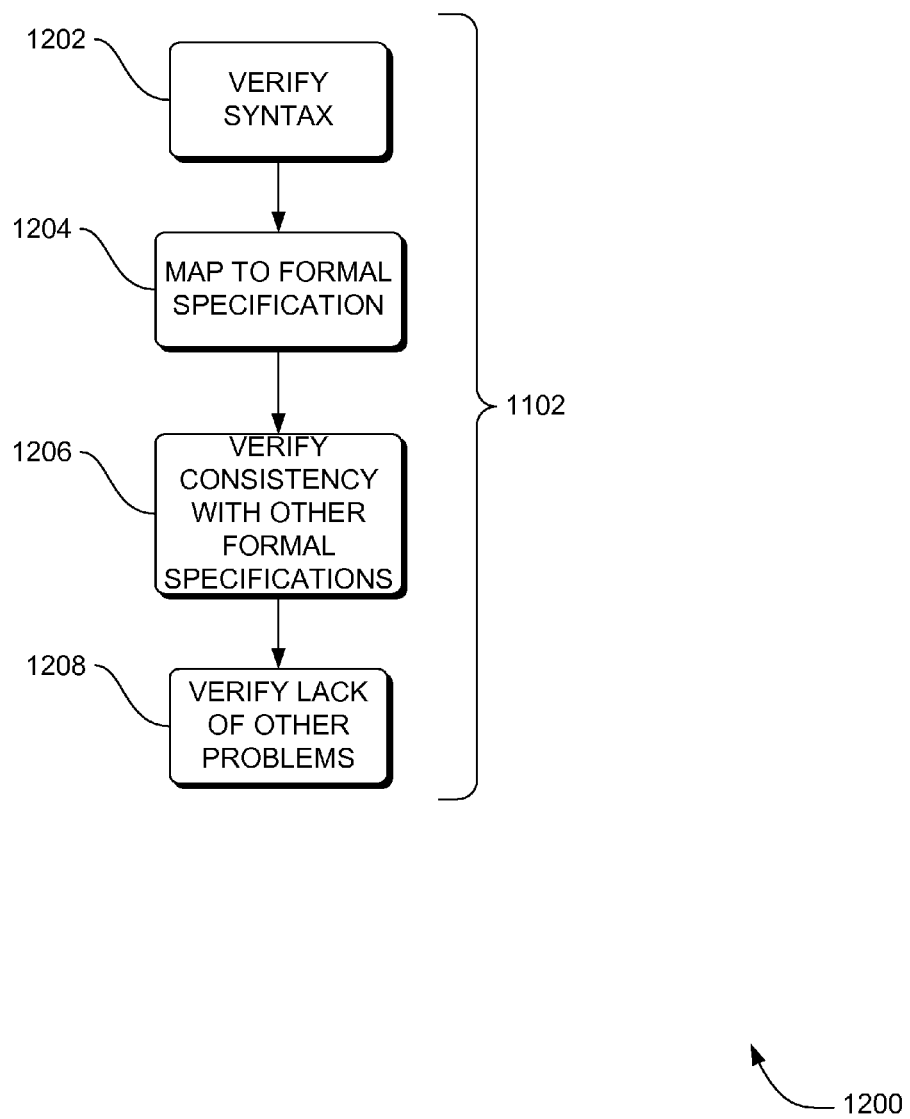
FIG. 12 is a flowchart of a method to verify the syntax of a set of policies, translate the set of policies to a formal specification, verify the consistency of the formal specification, and verify the absence of other problems, according to an embodiment.

In some embodiments, method 1100 includes translating 1102 mechanically each of a plurality of requirements of the policy to a plurality of formal specification segments. In some embodiments, the translating 1102 includes inferring the formal specification segments from the policy. One embodiment of translating 1102 is shown in FIG. 12 below.

In some embodiments, the formal specification is process algebra notation. Such embodiments may satisfy the need in the art for an automated, mathematics-based process for policy validation that does not require large computational facilities.

Thereafter, method 1100 may include aggregating 1104 the plurality of formal specification segments into a single formal specification or model.

Subsequently, method 1100 may include translating 1106 the single formal specification to instructions encoded in the Java computer language or some other high-level computer programming language. Thereafter, method 1100 may include compiling 1108 the instructions encoded in the high-level computer language into a file of executable instructions or code.

In some embodiments, method 1100 includes invoking the executable instructions, which provides a method to convert policies to an application system without involvement from a computer programmer.

Some embodiments of method 1100 do not include invoking a theorem-prover to infer the formal specification segments from the policy.

FIG. 12 is a flowchart of a method 1200 to translate mechanically each of a plurality of requirements of the policy to a plurality of formal specification segments, according to an embodiment. Method 1200 is an example of an embodiment of translating 1102 in FIG. 11.

In some embodiments, method 1200 includes verifying 1202 the syntax of the plurality of requirements of the policy. Thereafter, method 1200 may include mapping 1204 the plurality of requirements of the policy to a formal specification.

In some embodiments, method 1200 subsequently also includes verifying 1206 consistency of the formal specification with at least one other formal specification. In some embodiments, method 1200 subsequently also includes verifying 1208 lack of other problems in the formal specification. One example of other problems is unreachable states in the process defined in the formal specification, although one skilled in the art will recognize that other problems fit within the scope of this invention.

Figure 13:
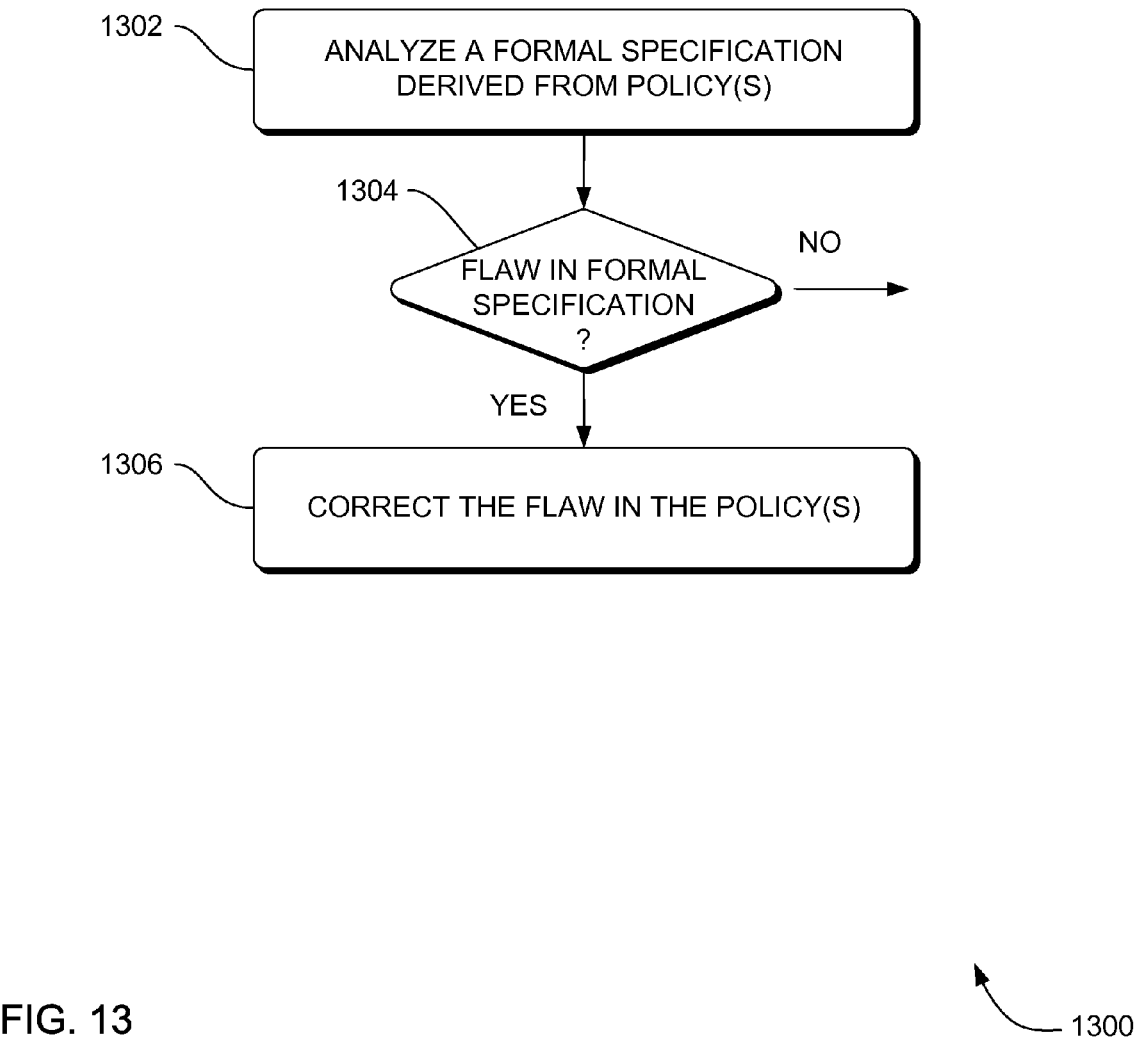
FIG. 13 is a flowchart of a method to validate/update policies of a system, according to an embodiment.

FIG. 13 is a flowchart of a method 1300 to validate/update a system, according to an embodiment. Method 1300 may solve the need in the prior art to reduce errors in implementations.

Method 1300 can include analyzing 1302 a formal specification, such as formal specification 306, of the system, the formal specification 306 having been previously derived from the policies of the system.

In some embodiments, the analyzing 1302 can include applying mathematical logic to the formal specification 306 in order to identify a presence or absence of mathematical properties of the formal specification 306. Mathematical properties of the formal specification 306 that can be determined by applying mathematical logic to the formal specification 306 can include, by way of example:

1) whether or not the formal specification 306 implies a system execution trace that includes a deadlock condition, and 2) whether or not the formal specification 306 implies a system execution trace that includes a livelock condition.

The above two properties can be domain independent. One skilled in the art will note that there are many other possible flaws that could be detected through the analysis of the model, many or even most of which might be domain dependent. An example of a domain dependent property would be represented by the operational principle that "closing a door that is not open is not a valid action." This example would be applicable in the domain of the Hubble Space Telescope on-orbit repair.

Thereafter, a determination 1304 can be made as to whether or not the analyzing 1302 indicates that the formal specification 306 contains a flaw. If a flaw does exist, then the policies can be corrected 1306 accordingly.

Figure 14:
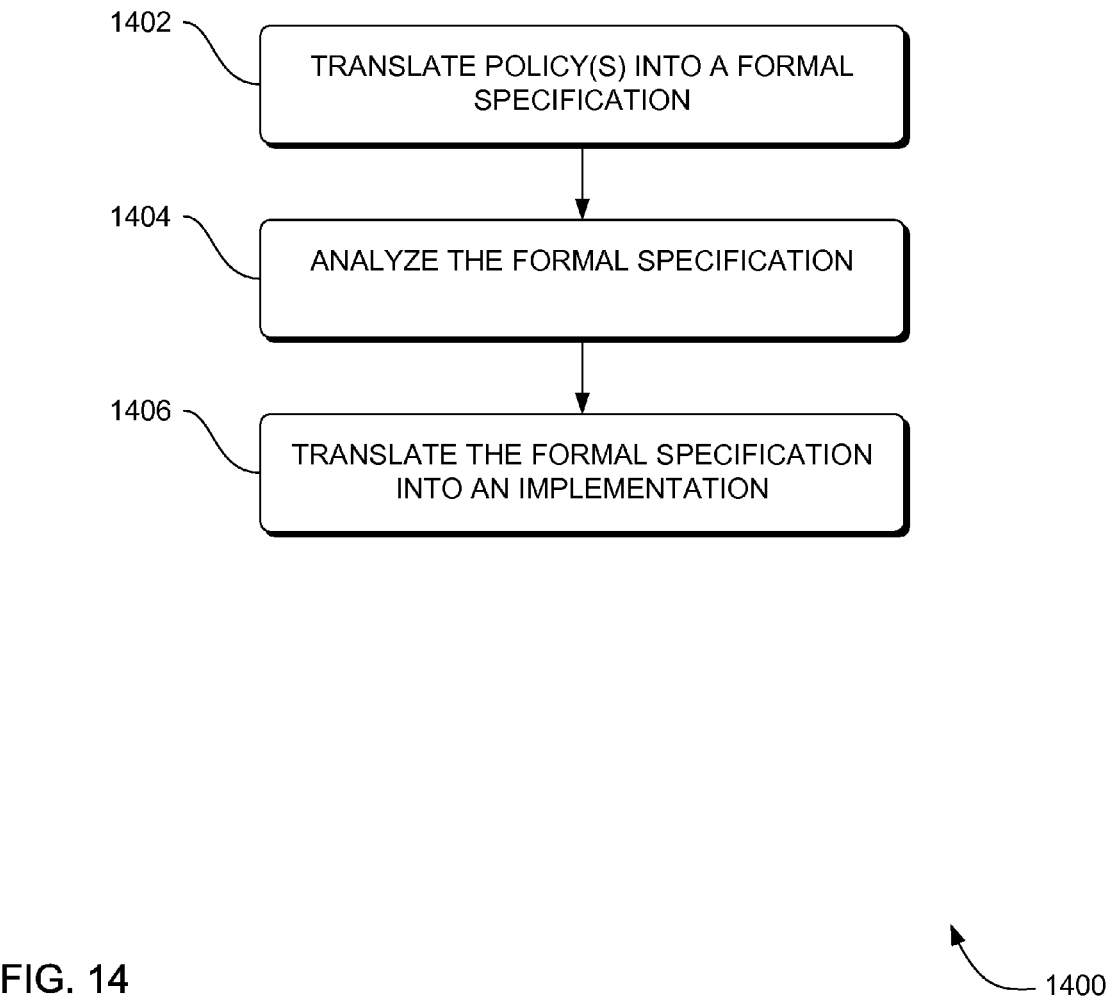
FIG. 14 is a flowchart of a method to translate one or more policies of a system to an implementation, according to an embodiment.

Once a correction is made, then the corrected policies can be processed by system 400 in FIG. 4 or method 1400 in FIG. 14 to derive a new implementation from the corrected policies. According to at least one embodiment, the new policy(s) 402 can be processed by method 1300, and the iterations of method 1400 and method 1300 can repeat until there are no more flaws in the implementation 410 generated from the policies, at which point the policies have no flaws because the implementation 410 is provably equivalent to the policy from which it was derived. Thus, iterations of method 1400 and 1300 can provide verification/validation of the policies.

FIG. 14 is a flowchart of a method to translate one or more policies of a system to an implementation, according to an embodiment. The method 1400 can include translating 1402 policies 402 into a formal specification 108 without human intervention.

Thereafter, method 1400 can include optionally analyzing 1404 the formal specification 108. The analyzing 1404 can be a verification/validation of the policies 402. In some embodiments, the analyzing 1404 determines various properties such as existence of omissions, deadlock, livelock, and race conditions in the formal specification 306, although one skilled in the art will know that analyzing the formal specification 306 can determine other properties not specifically listed, which are contemplated by this invention. In some embodiments, the analyzing 1404 can provide a mathematically sound analysis of the policies 402 in a general format that doesn't require significant understanding of the specific rules of the policies 402. Further, the analyzing 1404 can warn developers of errors in their policies 402, such as contradictions and inconsistencies, but equally importantly it can highlight rules or sets of rules that are underspecified or over-specified and need to be corrected for the policies 402 to operate as intended. Thus, no knowledge of the policies 402 may be required, but instead significant analysis, verification, testing, simulation and model checking of the policies 402 using customized tools or existing tools and techniques is provided.

Thereafter, in some embodiments, method 1400 can include translating 1406 the formal specification to an implementation 410. Thus, in at least one embodiment, the method 1400 provides a method to convert policies 402 to an implementation 410 without involvement from a computer programmer.

Most notably, some embodiments of the method 1400 do not include invoking an automated logic engine, such as a theorem-prover, to infer the implementation 410 from the policies 402.

In some embodiments of method 1400, one or more policies 402 that represent the operation of a system can be mechanically converted to a mathematically sound formal 306 specification that can be analyzed for defects and used for various transformations including automatic translation into executable form and automatic regeneration of procedures/scripts into other notations/representations. In other embodiments, the method disclosed herein can be used to automatically reverse engineer existing implementations 410 to formal specification 306 from which the method can be used to produce customer-readable representations of policy(s) 402 or machine-processable implementations 410.

Mathematically sound techniques may be used to mechanically translate one or more policy(s) 402 into an equivalent formal specification 306. The formal specification 306 may be mechanically (that is, with no manual intervention) manipulated, examined, analyzed, verified, and used in a simulation.

Figure 15:
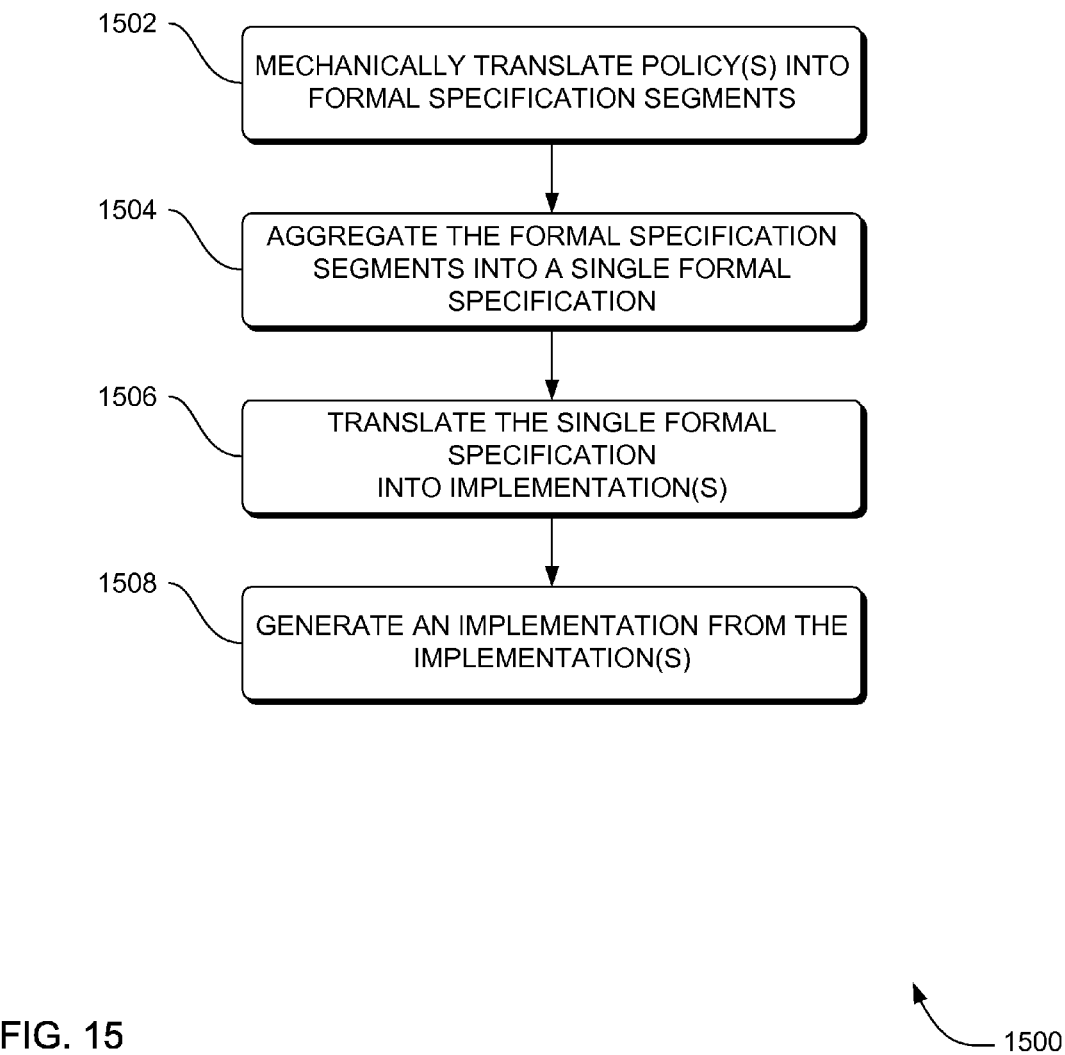
FIG. 15 is a flowchart of a method to translate each of a plurality of policies, according to an embodiment.

FIG. 15 is a flowchart of a method 1500 to translate each of a plurality of policy(s) to a plurality of formal specification segments, and formally compose the plurality of formal specification segments into a single equivalent specification, and translate the single formal specification into an implementation, according to an embodiment. Method 1500 can solve the need in the art to generate implementations from policy with neither the time involved in manually writing the scripts, nor the mistakes that can arise in manually writing the implementation, without using an automated logic engine.

Figure 16:
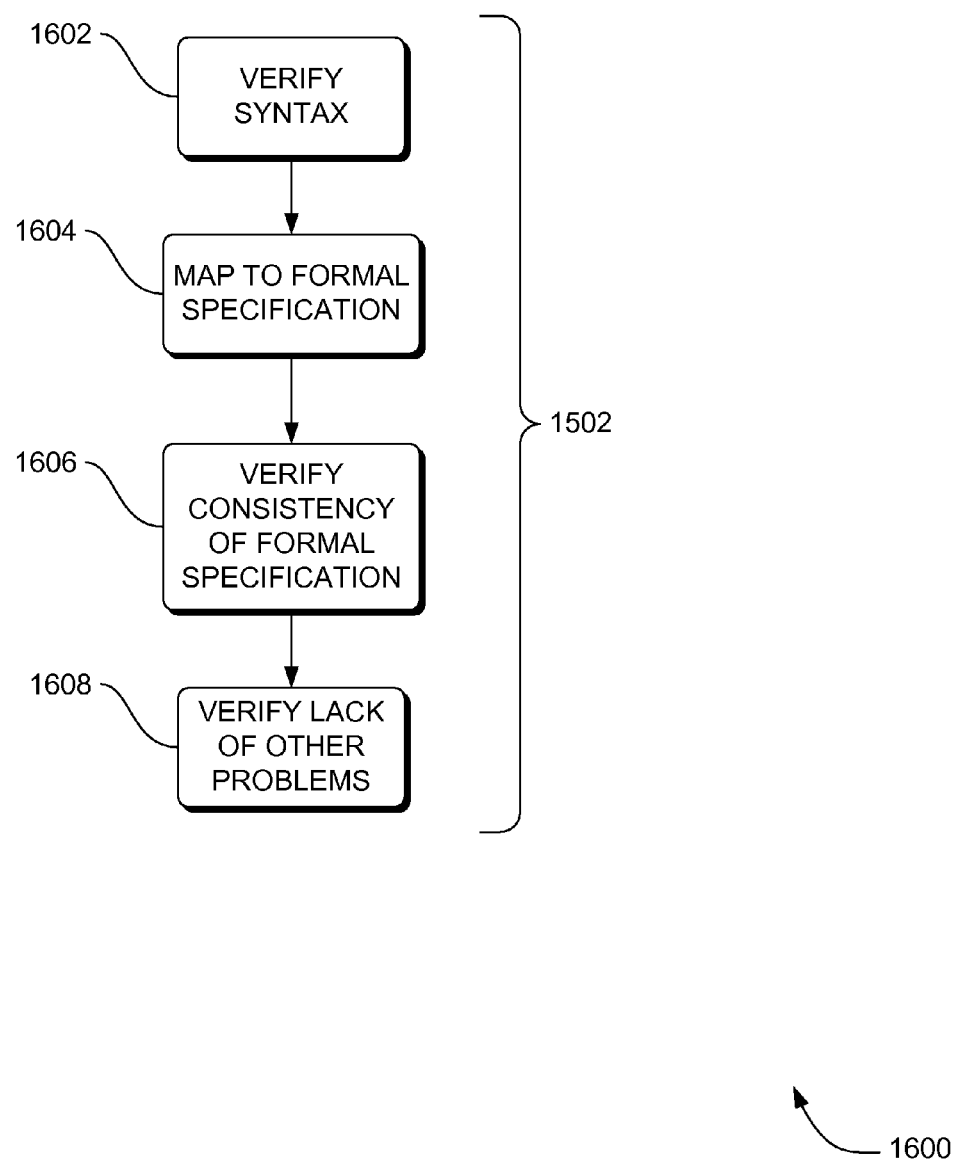
FIG. 16 is a flowchart of a method to generate a formal specification from one or more policies, according to an embodiment.

Method 1500 can include mechanically translating 1502 each of a plurality of policies 402 to a plurality of formal specification segments. The translation may be done without human intervention. One embodiment of translating 1502 is shown in FIG. 16 below.

Thereafter, method 1500 can include aggregating 1504 the plurality of formal specification segments into a single formal model or specification.

Subsequently, method 1500 can include translating 1506 the single formal specification or model to multiple implementations. Thereafter, method 1500 can include generating 1508 a singular implementation from the implementations. Thus, method 1500 provides one embodiment of a method to convert a policy 402 to an application system without involvement from a computer programmer.

Some embodiments of method 1500 do not include invoking a theorem-prover or any other automated logic engine to infer the formal specification segments from the policies.

FIG. 16 is a flowchart of a method 1600 to verify the syntax of a set of policies, translate the set of policies to a formal specification, verify the consistency of the formal specification, and verify the absence of other problems, according to an embodiment. Method 1600 is one embodiment of translating 1502 in FIG. 15. As indicated, such translation can be accomplished without human intervention.

In some embodiments, the method 1600 can include verifying 1602 the syntax of the plurality of policies. Thereafter, method 1600 can include mapping 1604 the plurality of policies to a formal specification.

In some embodiments, method 1600 subsequently can also include verifying 1606 consistency of the formal specification. In some embodiments, method 1600 subsequently also includes verifying 1608 a lack of other problems in the formal specification. One example of other problems is unreachable states in the process defined in the formal specification, although one skilled in the art will understand that yet other problems are contemplated.

Hardware and Operating Environment

FIG. 17 is a block diagram of the hardware and operating environment 1700 in which different embodiments can be practiced. The description of FIG. 17 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment. Some embodiments can also be at least partially implemented in a quantum mechanical computing and communications environment.

Computer 1702 may include a processor 1704, commercially available from Intel, Motorola, Cyrix and others. Computer 1702 can also include random-access memory (RAM) 1706, read-only memory (ROM) 1708, and one or more mass storage devices 1710, and a system bus 1712, that operatively couples various system components to the processing unit 1704. The memory 1706, 1708, and mass storage devices, 1710, are types of computer-accessible media. Mass storage devices 1710 are more specifically types of nonvolatile computer-accessible media and can include one or more hard disk drives, floppy disk drives, optical disk drives, and tape cartridge drives. The processor 1704 can execute computer programs stored on the computer-accessible media.

Computer 1702 can be communicatively connected to the Internet 1714 (or any communications network) via a communication device 1716. Internet 1714 connectivity is well known within the art. In one embodiment, a communication device 1716 is a modem that responds to communication drivers to connect to the Internet via what is known in the art as a "dial-up connection." In another embodiment, a communication device 1716 is an Ethernet® or similar hardware network card connected to a local-area network (LAN) that itself is connected to the Internet via what is known in the art as a "direct connection" (e.g., T1 line, etc.).

A user enters commands and information into the computer 1702 through input devices such as a keyboard 1718 or a pointing device 1720. The keyboard 1718 permits entry of textual information into computer 1702, as known within the art, and embodiments are not limited to any particular type of keyboard. Pointing device 1720 permits the control of the screen pointer provided by a graphical user interface (GUI) of operating systems such as versions of Microsoft Windows®. Embodiments are not limited to any particular pointing device 1720. Such pointing devices may include mice, touch pads, trackballs, remote controls and point sticks. Other input devices (not shown) can include a microphone, joystick, game pad, gesture-recognition or expression recognition devices, or the like.

In some embodiments, computer 1702 is operatively coupled to a display device 1722. Display device 1722 can be connected to the system bus 1712. Display device 1722 permits the display of information, including computer, video and other information, for viewing by a user of the computer. Embodiments are not limited to any particular display device 1722. Such display devices include cathode ray tube (CRT) displays (monitors), as well as flat panel displays such as liquid crystal displays (LCD's) or image and/or text projection systems or even holographic image generation devices. In addition to a monitor, computers typically include other peripheral input/output devices such as printers (not shown). Speakers 1724 and 1726 (or other audio device) provide audio output of signals. Speakers 1724 and 1726 are also connected to the system bus 1712.

Computer 1702 may include an operating system (not shown) that is stored on the computer-accessible media RAM 1706, ROM 1708, and mass storage device 1710, and is executed by the processor 1704. Examples of operating systems include Microsoft Windows®, Apple MacOS®, Linux®, UNIX®. Examples are not limited to any particular operating system, however, and the construction and use of such operating systems are well known within the art.

Embodiments of computer 1702 are not limited to any type of computer 1702. In varying embodiments, computer 1702 comprises a PC-compatible computer, a MacOS®-compatible computer, a Linux®-compatible computer, or a UNIX®-compatible computer. The construction and operation of such computers are well known within the art.

Computer 1702 can be operated using at least one operating system to provide a graphical user interface (GUI) including a user-controllable pointer. Computer 1702 can have at least one web browser application program executing within at least one operating system, to permit users of computer 1702 to access an intranet, extranet or Internet world-wide-web pages as addressed by Universal Resource Locator (URL) addresses. Examples of browser application programs include Netscape Navigator® and Microsoft Internet Explorer®.

The computer 1702 can operate in a networked environment using logical connections to one or more remote computers, such as remote computer 1728. These logical connections can be achieved by a communication device coupled to, or a part of, the computer 1702. Embodiments are not limited to a particular type of communications device. The remote computer 1728 can be another computer, a server, a router, a network PC, a client, a peer device or other common network node. The logical connections depicted in FIG. 17 include a local-area network (LAN) 1730 and a wide-area network (WAN) 1732. Such networking environments are commonplace in offices, enterprise-wide computer networks, intranets, extranets and the Internet.

When used in a LAN-networking environment, the computer 1702 and remote computer 1728 are connected to the local network 1730 through network interfaces or adapters 1734, which is one type of communications device 1716. Remote computer 1728 also includes a network device 1736. When used in a conventional WAN-networking environment, the computer 1702 and remote computer 1728 communicate with a WAN 1732 through modems (not shown). The modem, which can be internal or external, is connected to the system bus 1712. In a networked environment, program modules depicted relative to the computer 1702, or portions thereof, can be stored in the remote computer 1728.

Computer 1702 also includes power supply 1738. Each power supply can be a battery.

CSP Implementation

Figure 18:
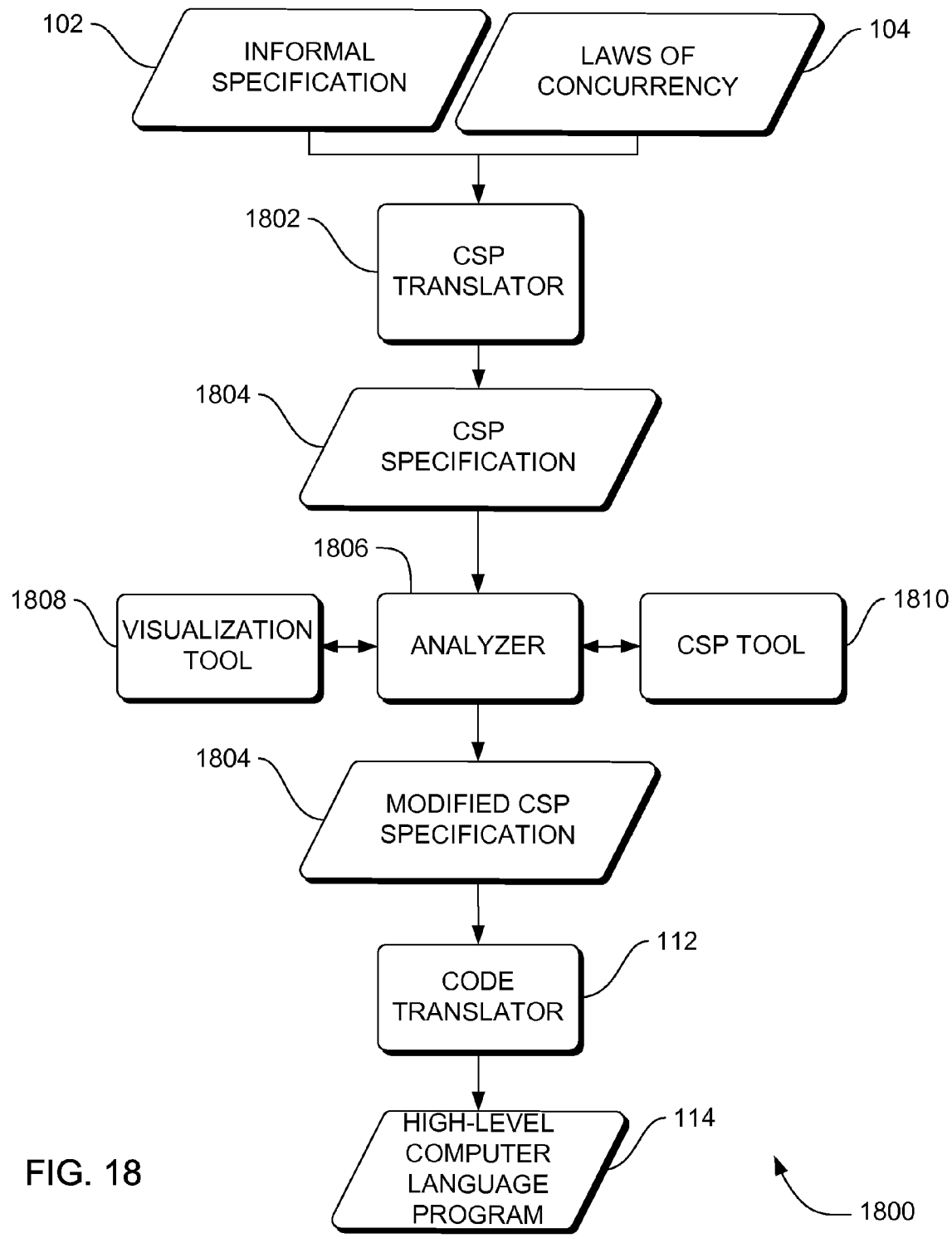
FIG. 18 is a block diagram of a CSP implementation of an apparatus to generate a high-level computer source code program from an informal specification, according to an embodiment.

Referring to FIG. 18, a particular CSP implementation 1800 is described in conjunction with the system overview in FIG. 1 and the methods described in conjunction with FIG. 5 and FIG. 6, according to an embodiment.

FIG. 18 is a block diagram of a particular CSP implementation of an apparatus 1800 to generate a high-level computer source code program from an informal specification, according to an embodiment. Apparatus 1800 may solve the need in the art for an automated, generally applicable way to produce a system that is a provably correct implementation of an informal design specification that does not require use of a theorem-prover.

Apparatus 1800 may include an informal specification 102 having a plurality of rules or requirements. The informal specification 102 can be expressed in restricted natural language, graphical notations, or even using semi-formal notations such as unified modeling language (UML) use cases. Apparatus 1800 may also include a set of laws of concurrency 104.

The informal specification 102 and a set of laws of concurrency 104 may be received by a mechanical CSP translator 1802. The plurality of rules or requirements of the informal specification 102 can be translated mechanically to a specification 1804 encoded in Hoare's language of Communicating Sequential Processes (CSP). In some embodiments, the mechanical CSP translator 1802 performs actions 502 and 504 in FIG. 5.

In some embodiments, the system includes a formal specification analyzer 1806 to perform model verification/checking and determine existence of omissions, deadlock, livelock and race conditions in the CSP specification 1804. In some embodiments, the formal specification analyzer 1806 receives and transmits information from and to a visualization tool 1808 that provides a way to modify the CSP specification 1804. In some embodiments, the formal specification analyzer 1806 receives and transmits information from and to a tool 1810 designed for CSP that provides a way to modify the CSP specification 1804.

The formal specification analyzer 1806 can generate a modified CSP specification 1804 that may in turn be received by a code translator 112 or compiler to translate the plurality of process-based specification segments 108 to a set of instructions in a high-level computer language program 114, such as Java language.

Formal specification analyzer 1806 may allow the user to manipulate the formal specification 1804 in various ways. The formal specification analyzer 1806 may allow the user to examine the system described by the informal specification 102, and to manipulate it. The CSP specification 1804 may be analyzed to highlight undesirable behavior, such as race conditions, and equally important, to point out errors of omission in the informal specification 102. The formal specification analyzer 1806 may be an optional but useful stage in the disclosed embodiments of the present invention. If the formal specification analyzer 1806 is not used, then the process-based specification 108 and the modified CSP specification 1804 can be identical. Hence, if the formal specification analyzer 1806 is not used then all references to the modified CSP specification 1804 disclosed below may also apply to the CSP specification 1804.

Some embodiments of apparatus 1800 do not include a theorem-prover to infer the process-based specification segments from the informal specification.

Apparatus 1800 can be operational for a wide variety of informal specification languages and applications, thus apparatus 1800 can be generally applicable. Such applications may include distributed software systems, sensor networks, robot operation, complex scripts for spacecraft integration and testing, and autonomous systems.

Apparatus 1800 components of the mechanical CSP translator 1802, the formal specification analyzer 1806, visualization tool 1808, CSP tool 1810 and the code translator 112 can be embodied as computer hardware circuitry or as a computer-readable program, or a combination of both, such as shown in FIG. 18. In another embodiment, apparatus 1800 may be implemented in an application service provider (ASP) system.

Figure 19:
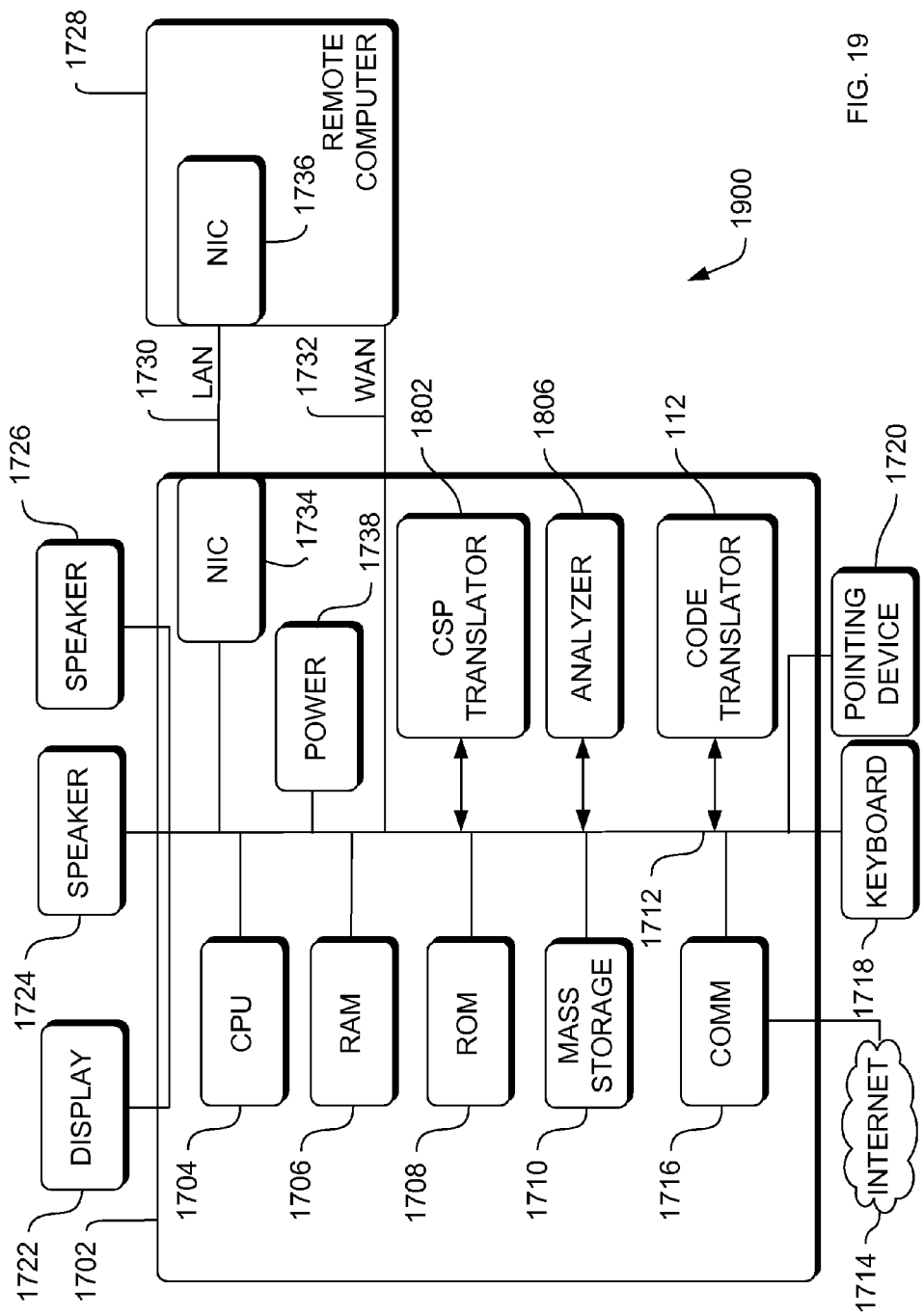
FIG. 19 is a block diagram of a hardware and operating environment in which a particular CSP implementation of FIG. 18 can be implemented, according to an embodiment.

FIG. 19 is a block diagram of a hardware and operating environment 1900 in which a particular CSP implementation of FIG. 18 is implemented, according to an embodiment.

Script Implementation

Figure 20:
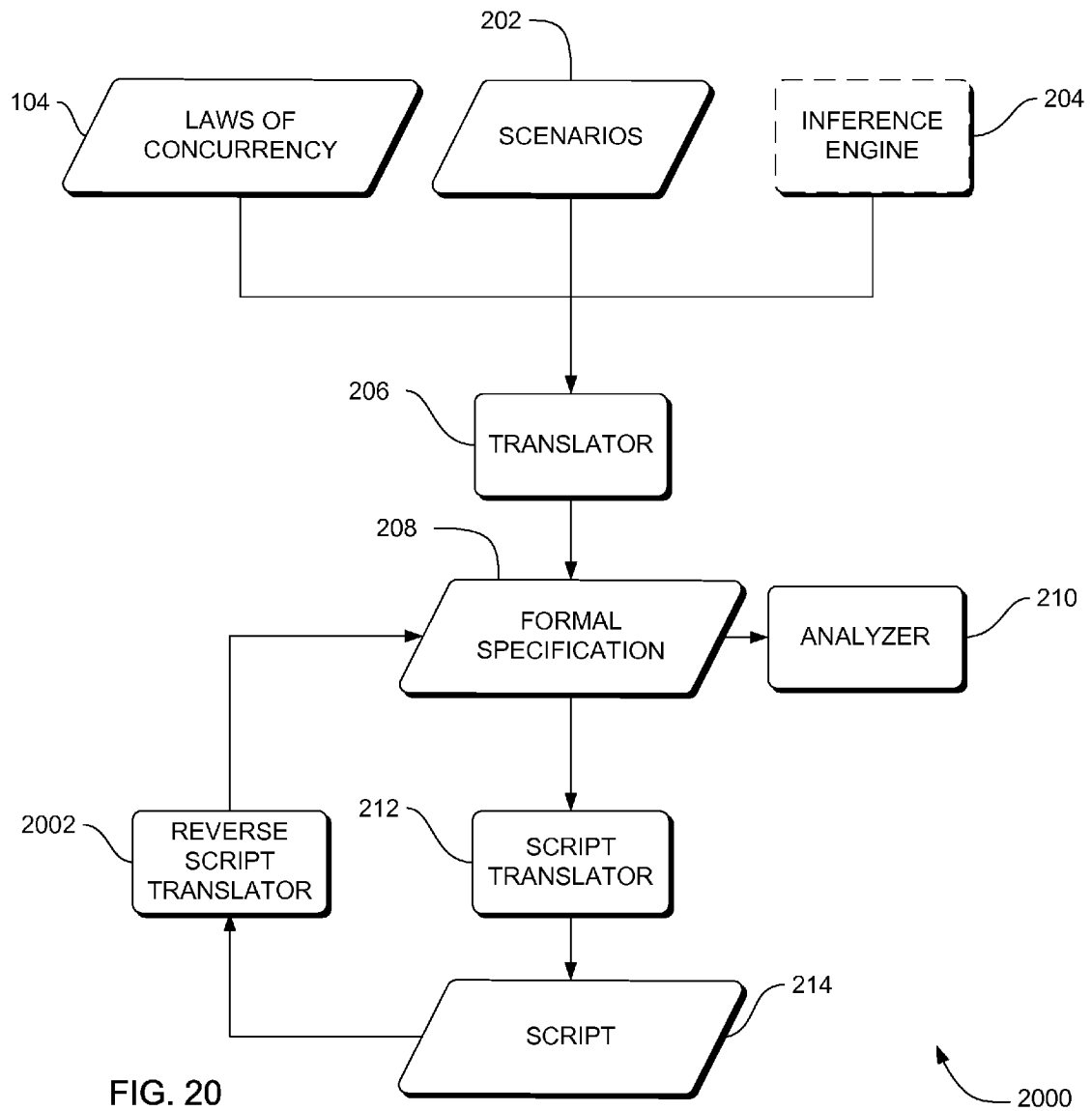
FIG. 20 is a block diagram of a particular implementation of an apparatus capable of translating scenarios to a formal specification.
Figure 21:
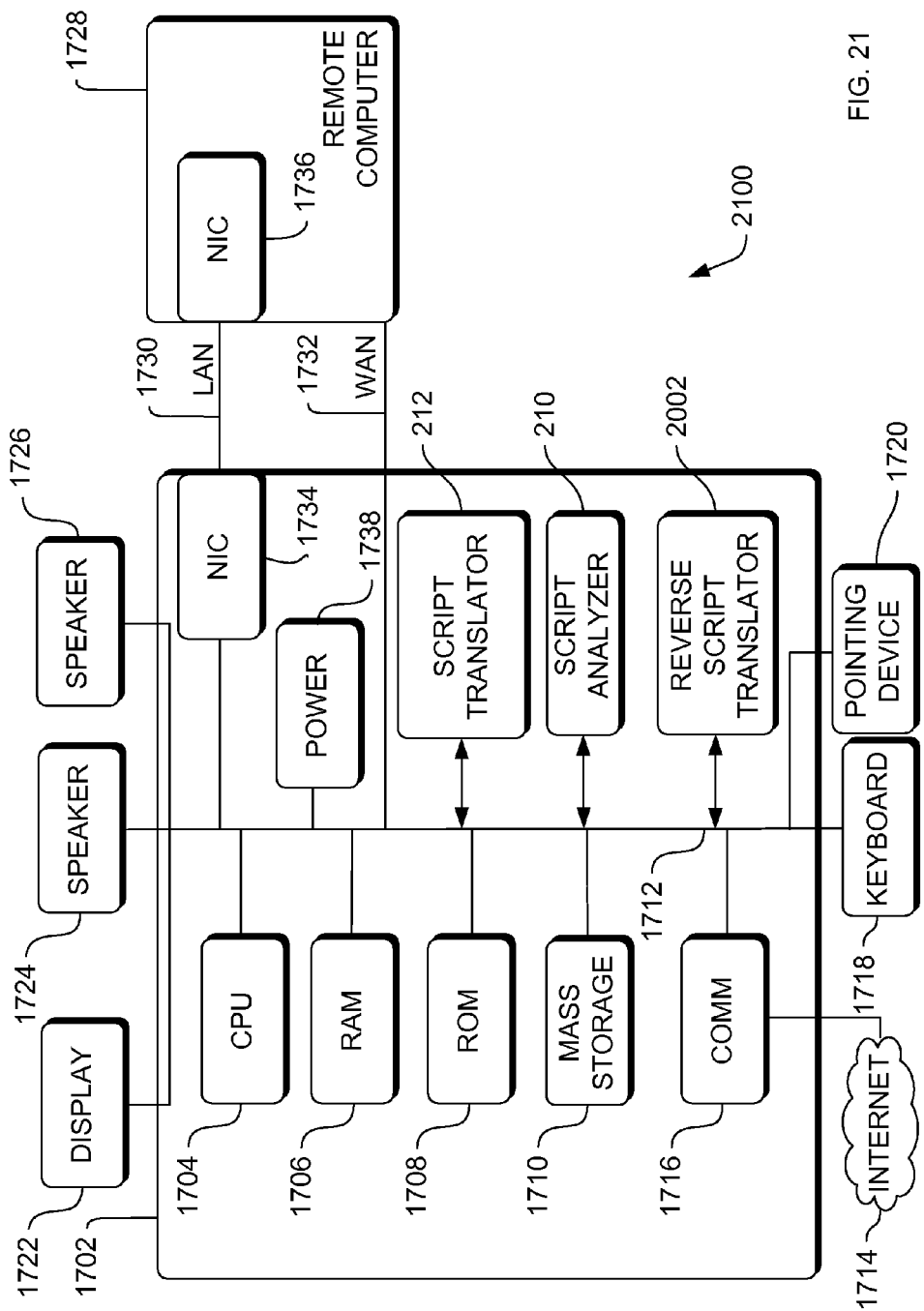
FIG. 21 is a block diagram of a hardware and operating environment in which components of FIG. 20 can be implemented, according to an embodiment.

Referring to FIGS. 20 and 21, a particular scripting language implementation 2000 is described in conjunction with the system overview in FIG. 2 and the methods described in conjunction with FIGS. 5-16, according to an embodiment.

FIG. 20 is a block diagram of a particular implementation of an apparatus capable of translating scenarios to a formal specification, optionally analyzing the formal specification and translating the formal specification to a script and reverse engineering (translating) a script into a formal specification (and possibly analyzing the formal specification), according to an embodiment. Apparatus 2000 can solve the need in the art for an automated, generally applicable way to verify that implemented scripts are a provably correct implementation of a scenario(s).

Apparatus 2000 can include a translator 206 that generates a formal specification 208 from the laws of concurrency 104 and the scenario(s) 202 in reference to the optional inference engine 204.

Subsequently, the formal specification 208 may be translated by script translator 212 into a script 214 in some appropriate scripting language. In some embodiments no manual intervention in the translation is provided. Those skilled in the art will readily understand that other appropriate notations and/or languages exist that are within the scope of this invention.

In some embodiments, apparatus 2000 can include an analyzer 210 to determine various properties of the formal specification, such as the existence of omissions, deadlock, livelock, and race conditions, as well as other conditions, in the formal specification 208, although one skilled in the art will recognize that other additional properties can be determined by the analyzer 210. The analyzer 210 may solve the need in the prior art to reduce errors.

In some embodiments, a reverse script translator 2002 receives the script 214 and generates a formal specification 208. The output of the reverse script translator 2002 can be a different formal specification than formal specification 208. In some embodiments, there can be some small differences between the formal specification generated by reverse script translator 2002 and formal specification 208, but the formal specifications generated by the reverse script translator 2002 is substantially functionally equivalent to the formal specification 208.

Apparatus 2000 can operate for a wide variety of languages and applications, and thus apparatus 2000 can be generally applicable. Such applications can include, without limitation, distributed software systems, sensor networks, robot operation, complex scripts for spacecraft integration and testing, and autonomous systems, but those skilled in the art will understand that other applications are contemplated.

Apparatus 2000 components such as the translator 206, script translator 212, the analyzer 210, and the reverse script translator 2002 can be embodied as computer hardware circuitry or as a computer-readable program, or a combination of both, such as shown in FIG. 21. In other embodiments, apparatus 2000 can be implemented in an application service provider (ASP) system.

FIG. 21 illustrates an environment 2100 similar to that of FIG. 17, but with the addition of the script translator 212, the analyzer 210 and the reverse script translator 2002 that correspond to some of apparatus 2000.

R2D2C Implementation

Figure 22:
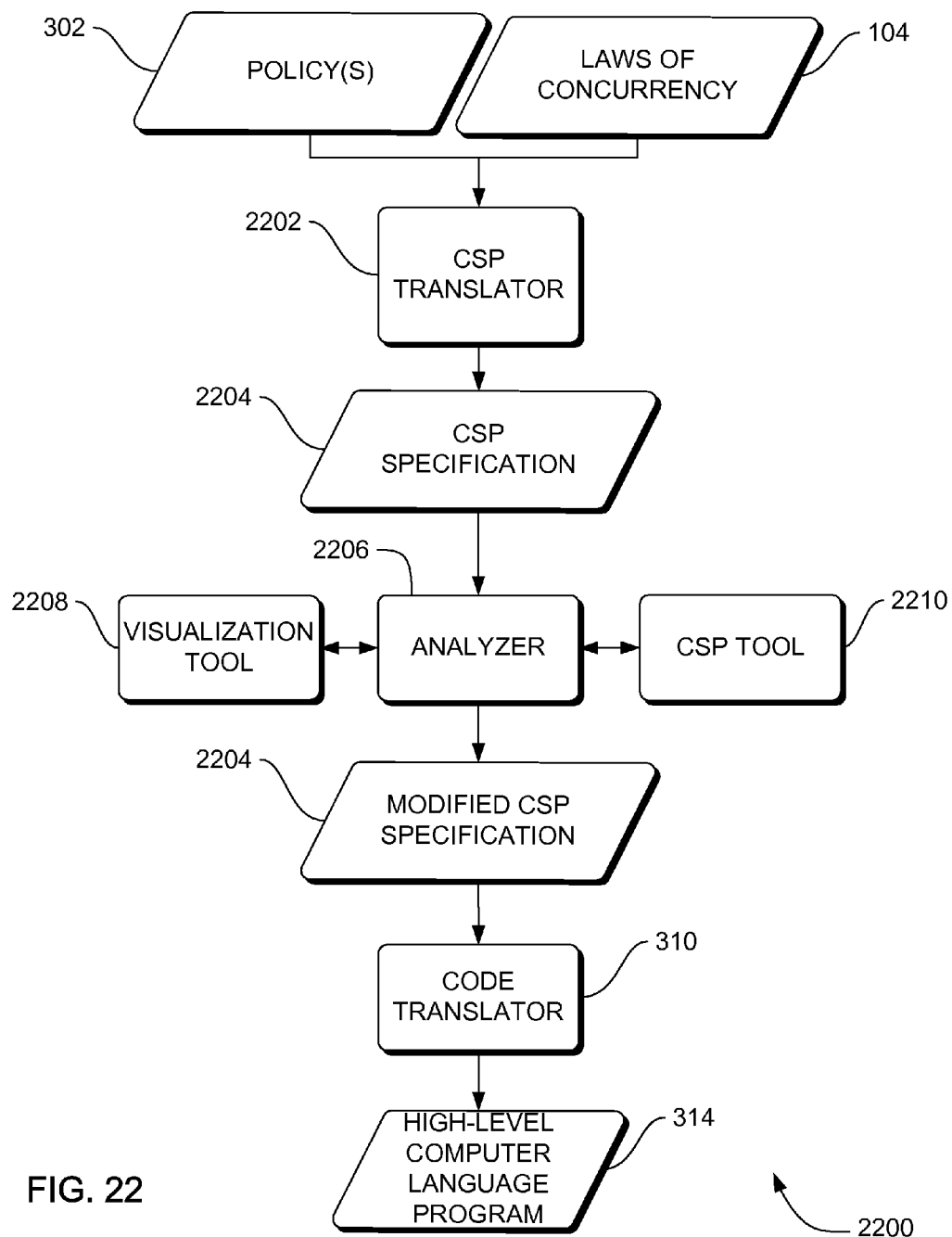
FIG. 22 is a block diagram of a R2D2C implementation of an apparatus to generate a high-level computer source code program from a policy, according to an embodiment.

Referring to FIG. 22, a particular R2D2C implementation 2200 is described in conjunction with the system overview in FIG. 3 and the methods described in conjunction with FIG. 11 and FIG. 12.

FIG. 22 is a block diagram of a particular R2D2C implementation of an apparatus 2200 to generate a high-level computer source code program from a policy, according to an embodiment. Apparatus 2200 may solve the need in the art for an automated, generally applicable way to produce a system that is a provably correct implementation of one or more policies that does not require use of a theorem-prover.

Apparatus 2200 may include a policy 302 having a plurality of rules or requirements. The policy 302 can be expressed in restricted natural language, graphical notations, or even using semi-formal notations such as unified modeling language (UML) use cases. Apparatus 2200 may also include a set of laws of concurrency 104.

The policy 302 and a set of laws of concurrency 104 can be received by a direct mechanical CSP translator 2202. The plurality of rules or requirements of the policy 302 can be translated mechanically to a specification 2204 encoded in Hoare's language of Communicating Sequential Processes (CSP). In some embodiments, the direct mechanical CSP translator 2202 performs actions 1102 and 1104 in FIG. 11.

In some embodiments, the system includes a formal specification analyzer 2206 to perform model verification/checking and determine existence of omissions, deadlock, livelock and race conditions in the CSP specification 2204. In some embodiments, the formal specification analyzer 2206 receives and transmits information from and to a visualization tool 2208 that provides a way to modify the CSP specification 2204. In some embodiments, the formal specification analyzer 2206 receives and transmits information from and to a tool 2210 designed for CSP that provides a way to modify the CSP specification 2204.

The formal specification analyzer 2206 may generate a modified CSP specification 2204 that is in turn received by a code translator 310 or compiler to translate the plurality of formal specification segments 306 to a set of instructions in a high-level computer language program 314, such as Java language.

In some embodiments, formal specification analyzer 2206 allows the user to manipulate the formal specification 2204 in various ways. The formal specification analyzer 2206 may allow the user to examine the system described by the policy 302, and to manipulate it. The CSP specification 2204 may be analyzed to highlight undesirable behavior, such as race conditions, and equally important, to point out errors of omission in the policy 302. The formal specification analyzer 2206 is an optional but useful stage in the disclosed embodiments of the present invention. If the formal specification analyzer 2206 is not used, then the formal specification 306 and the modified CSP specification 2204 can be identical. Hence, if the formal specification analyzer 2206 is not used then all references to the modified CSP specification 2204 disclosed below may also apply to the CSP specification 2204.

In some embodiments, apparatus 2200 does not include a theorem-prover to infer the formal specification segments from the policy.

Apparatus 2200 can be operational for a wide variety of policy languages and applications, thus apparatus 2200 can be generally applicable. Such applications may include distributed software systems, sensor networks, robot operation, complex scripts for spacecraft integration and testing, and autonomous systems.

Figure 23:
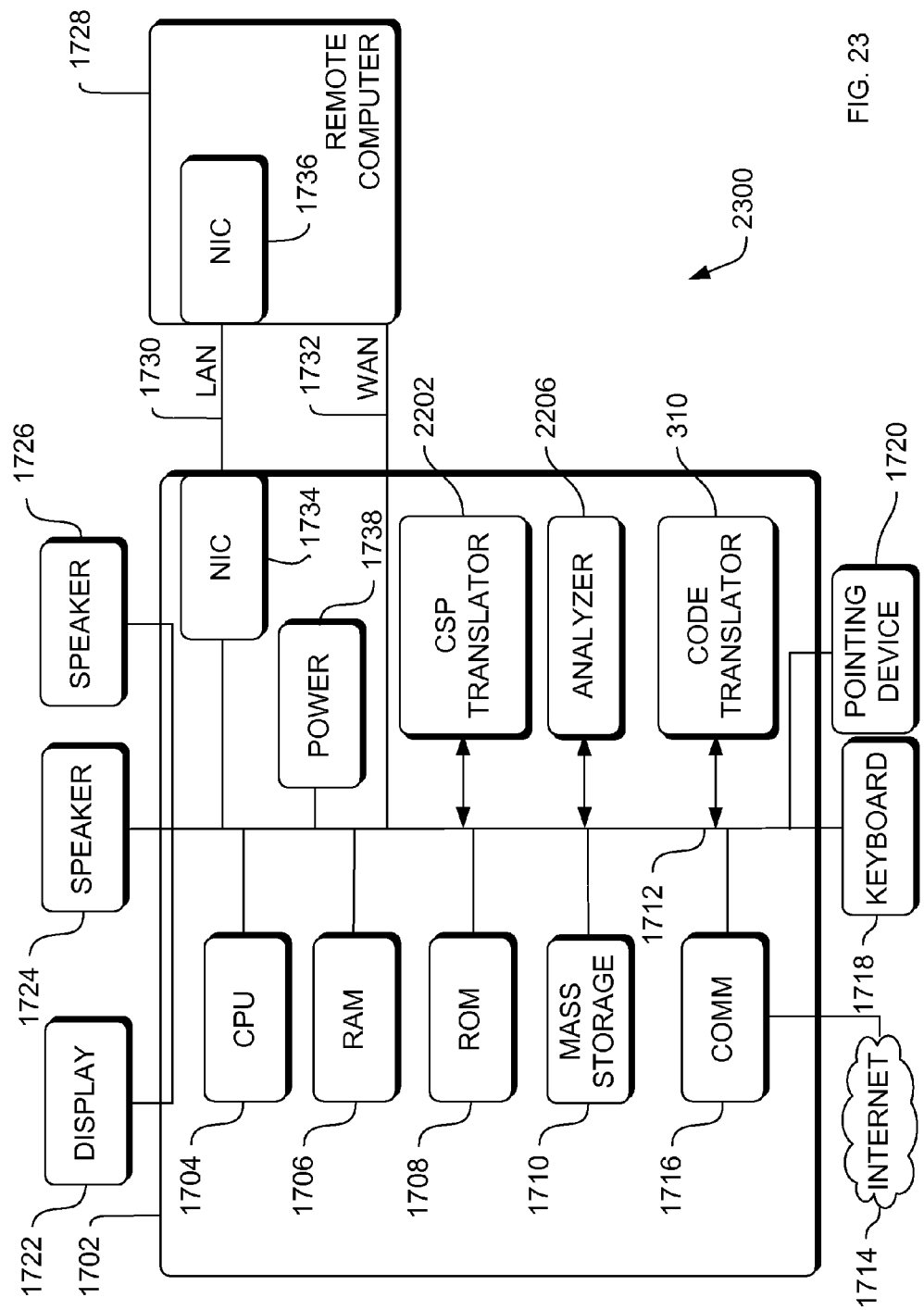
FIG. 23 is a block diagram of a hardware and operating environment in which a particular CSP implementation of FIG. 22 may be implemented, according to an embodiment.

Apparatus 2200 components of the mechanical CSP translator 2202, the formal specification analyzer 2206, visualization tool 2208, CSP tool 2210 and the code translator 310 can be embodied as computer hardware circuitry or as a computer-readable program, or a combination of both, such as shown in FIG. 23. In another embodiment, apparatus 2200 is implemented in an application service provider (ASP) system.

One approach to requirements-based programming is requirements-to-design-to-code (R2D2C), which provides a mathematically tractable round-trip engineering approach to system development. In R2D2C, engineers (or others) write specifications as scenarios in constrained (domain-specific) natural language, or in a range of other notations (including UML use cases), which is integrated to derive a formal model that is guaranteed to be equivalent to the requirements stated at the outset, and which will subsequently be used as a basis for code generation. The formal model can be expressed using a variety of formal methods such as CSP, Hoare's language of Communicating Sequential Processes. The R2D2C approach generates a formal model with automatic reverse engineering.

R2D2C is unique in that the methodology allows for full formal development from the outset, and maintains mathematical soundness through all phases of the development process, from requirements through to automatic code generation. The approach may also be used for reverse engineering, that is, in retrieving models and formal specifications from existing code. R2D2C can also be used to "paraphrase" (in natural language, etc.) formal descriptions of existing systems. This approach is not limited to generating high-level code. R2D2C can also be used to generate business processes and procedures, and to generate instructions for robotic devices such as those used on the Hubble Robotic Servicing Mission (HRSM). R2D2C can also be used as a basis for an expert system verification tool, and as a way of capturing domain knowledge for expert systems, and for generating policies from requirements.

The R2D2C approach involves a number of phases. The following describes each of these phases as understood in the prior art. The entire process, with D1 thru D5 illustrating the development approach, is suitable for various types of analysis and investigation, and as the basis for fully formal implementations as well as for use in automated test case generation and so forth.

D1 Scenarios Capture: Engineers, end users, and others write scenarios describing intended system operation. The input scenarios may be represented in a constrained natural language using a syntax-directed editor, or may be represented in other textual or graphical forms.

D2 Traces Generation: Traces and sequences of atomic events are derived from the scenarios defined in phase D1.

D3 Model Inference: A formal model, or formal specification, expressed in CSP is inferred by an automatic theorem-prover, in this case using the traces derived in phase D2. A deep embedding of the laws of concurrency in the theorem-prover gives it sufficient knowledge of concurrency and of CSP to perform the inference.

D4 Analysis: Based on the formal model, various analyses can be performed, using currently available commercial or public domain tools, and specialized tools that are planned for development. Because of the nature of CSP, the model may be analyzed at different levels of abstraction using a variety of possible implementation environments.

D5 Code Generation: The techniques of automatic code generation from a suitable model are reasonably well understood. The present modeling approach is suitable for the application of existing code generation techniques, whether using a tool specifically developed for the purpose, or existing tools such as FDR, or converting to other notations suitable for code generation (e.g., converting CSP to B and then using the code generating capabilities of the B Toolkit).

In some embodiments, an exemplary system for automatic control of ground stations of overhead satellites includes both autonomous and autonomic properties and operates by having a community of distributed autonomous software modules work cooperatively based on policies to perform the functions previously undertaken by human operators using traditional software tools, such as orbit generators and command sequence planners. In an example, a pager agent and a mapping from natural language descriptions through to the CSP model can be used to generate code.

Based on defined policies, the pager agent sends pages to engineers and controllers when there is a spacecraft anomaly. For example, the pager agent receives requests from a user interface agent that no analyst is logged on, so it gets paging information from a database agent and pages an appropriate analyst, and, when instructed by the user interface agent stops paging the analyst. These policies can be stated as follows:

When the pager agent receives a request from the user interface agent, the pager agent sends a request to the database agent for an analyst's pager information and puts the message in a list of requests to the database agent. When the pager agent receives a pager number from the database agent, then the pager agent removes the message from the paging queue and sends a message to the analyst's pager and adds the analyst to the list of paged people. When the pager agent receives a message from the user interface agent to stop paging a particular analyst, the pager agent sends a stop-paging command to the analyst's pager and removes the analyst from the paged list. When the pager agent receives another kind of message, it replies to the sender that the message was not recognized.

The above policies could then be translated into CSP. The following could be a partial CSP description of the pager agent:

```
PAGER_BUSdbwaiting,paged = pager. Iin?msg→
  case
    GET_USER_INFOdb_waiting,paged,pagee,text
      if msg = (STARTPAGING, specialist, text)
              BEGIN_PAGINGdb_waiting,paged,in_reply_to_id(msg),pager-num
      if msg = (RETURN_DATA.pager_num)
    STOP_CONTACTdb_waiting,paged,pagee
      if msg = (STOP_PAGING, pagee)
    pager.Iout!(head(msg), UNRECOGNIZED)
            →PAGER_BUSdb_waiting,paged
      otherwise
```

The above pseudo-language description states that the process PAGER_BUS receives a message on its "Iin" channel and stores it in a variable called "msg". Depending on the contents of the message, one of four different processes is executed based on the policies. If the message is of type START_PAGING, then the GET_USER_INFO process is called with parameters of the specialist to page (pagee) and the text to send. If the message is of type RETURN_DATA with a pagee's pager number, then the database has returned a pager number and the BEGIN_PAGING process is executed with a parameter containing the original message id (used as a key to the db-waiting set) and the passed pager number. The third type of message that the Pager agent might receive is one of type STOP_PAGING. This message contains a request to stop paging a particular specialist (stored in the pagee parameter). When this message is received, the STOP_PAGING process is executed with the parameter of the specialist type. If the pager agent receives any other message than the above three messages, an error message is returned to the sender of the message (which is the first item of the list) stating that the message is "UNRECOGNIZED". After this, the PAGER_BUS process is again executed.

Some of the benefits of using R2D2C, and hence of using Formal Requirements-Based Programming in system development include increasing assurance of system success by ensuring completeness and consistency of requirements, by ensuring that implementations are true to the requirements, by ensuring that automatically coded systems are bug-free; and by ensuring that implementation behavior is as expected. Another benefit is decreased costs and schedule impacts of ultra-high dependability systems through automated development and yet another benefit is decreased re-engineering costs and delays.

FIG. 23 is a block diagram of a hardware and operating environment 2300 in which a particular CSP implementation of FIG. 22 is implemented.

Policy Implementation

Figure 24:
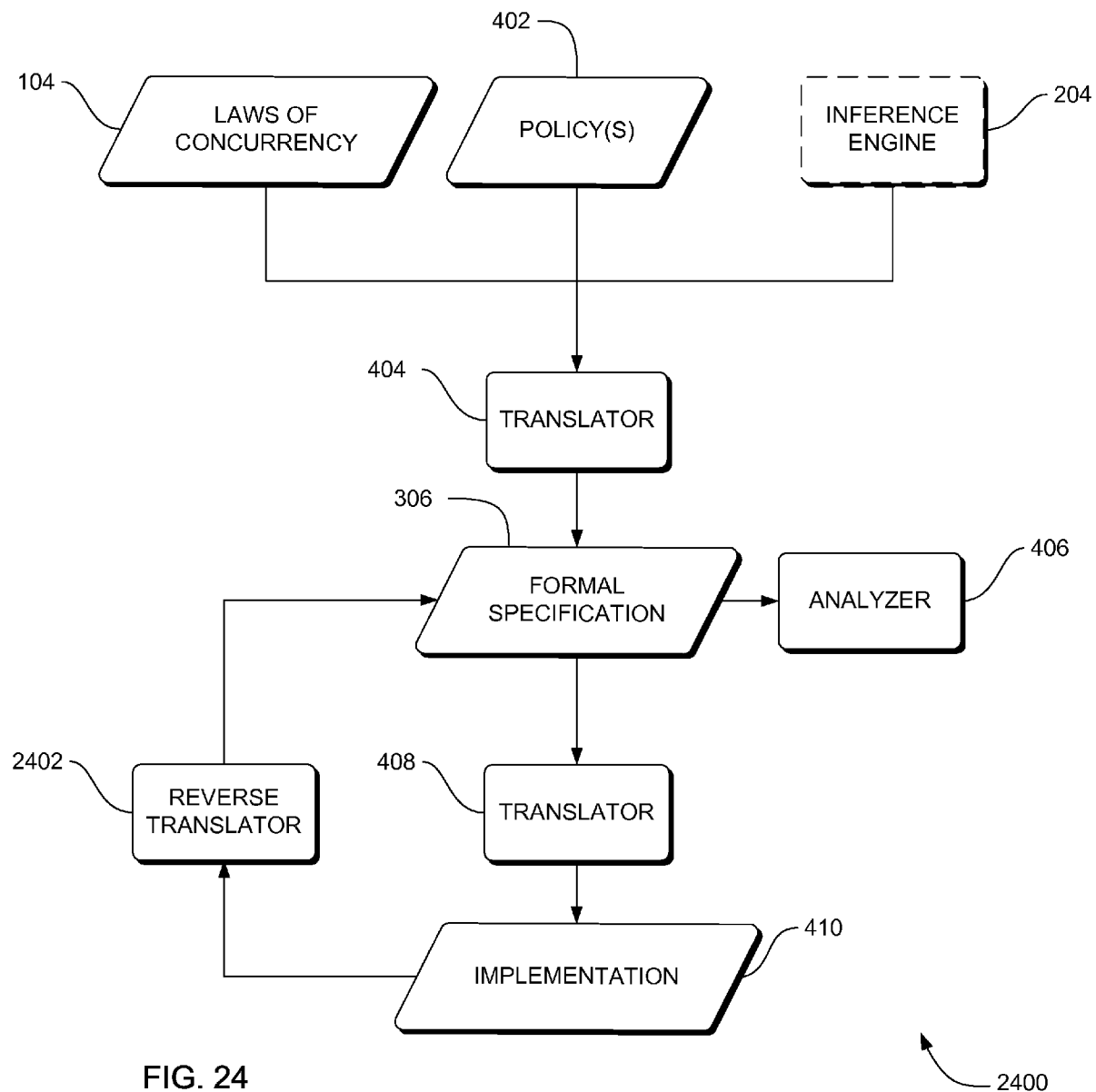
FIG. 24 is a block diagram of an implementation of an apparatus capable of translating one or more policies to a formal specification.
Figure 25:
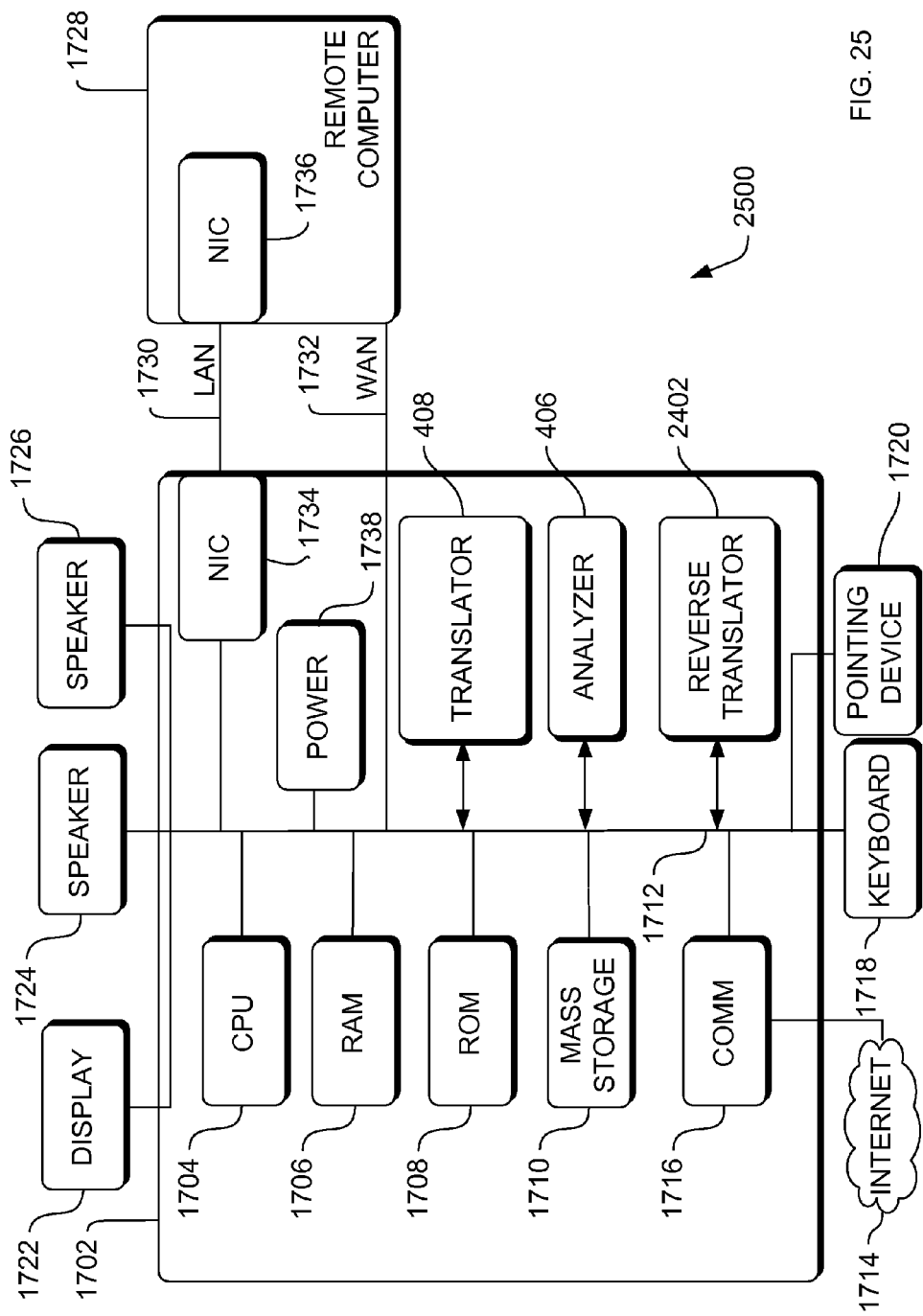
FIG. 25 is a block diagram of a hardware and operating environment in which components of FIG. 24 can be implemented, according to an embodiment.

Referring to FIGS. 24 and 25, a particular scripting language implementation 2400 is described in conjunction with the system overview in FIG. 2 and the methods described in conjunction with FIGS. 5-16.

FIG. 24 is a block diagram of a particular implementation of an apparatus 2400 capable of translating policies to a formal specification, optionally analyzing the formal specification and translating the formal specification to a script and reverse engineering (translating) a script into a formal specification (and possibly analyzing the formal specification), according to an embodiment. Apparatus 2400 may solve the need in the art for an automated, generally applicable way to verify that implementations are a provably correct implementation of a policy(s).

Apparatus 2400 can include a translator 404 that generates a formal specification 306 from the laws of concurrency 104 and the policy(s) 402 in reference to the optional inference engine 204.

Subsequently, the formal specification 306 may be translated by translator 408 into an implementation 410, such as some appropriate scripting language. In some embodiments, no manual intervention in the translation is provided. Those skilled in the art will readily understand that other appropriate notations and/or languages exist that are within the scope of this invention.

In some embodiments, apparatus 2400 can include an analyzer 406 to determine various properties of the formal specification, such as the existence of omissions, deadlock, livelock, and race conditions, as well as other conditions, in the formal specification 306, although one skilled in the art will recognize that other additional properties can be determined by the analyzer 406. The analyzer 406 can solve the need in the prior art to reduce errors.

In some embodiments, a reverse translator 2402 receives the implementation 410 and generates a formal specification. The output of the reverse translator 2402 is a different formal specification than formal specification 306. There can be some small differences between the formal specification generated by reverse translator 2402 and formal specification 306, but the formal specifications generated by the reverse translator 2402 is substantially functionally equivalent to the formal specification 306.

Apparatus 2400 can operate for a wide variety of languages and applications, and thus apparatus 2400 can be generally applicable. Such applications can include, without limitation, distributed software systems, sensor networks, robot operation, complex scripts for spacecraft integration and testing, and autonomous systems, but those skilled in the art will understand that other applications are contemplated.

Apparatus 2400 components such as the translator 404, translator 408, the analyzer 406, and the reverse translator 2402 can be embodied as computer hardware circuitry or as a computer-readable program, or a combination of both, such as shown in FIG. 25. In another embodiment, apparatus 2400 can be implemented in an application service provider (ASP) system.

FIG. 25 illustrates an environment 2500 similar to that of FIG. 17, but with the addition of the translator 408, the analyzer 406 and the reverse translator 2402 that correspond to some of apparatus 2400.

In a computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of ways that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components can execute on as few as one computer as in computer 1702 in FIG. 17, or on at least as many computers as there are components.

CONCLUSION

In autonomic computing, self-managed systems based on high level guidance from humans have been gaining ground as a significant new paradigm to facilitate the creation of self-managing systems to deal with the ever increasing complexity and costs inherent in today's (and tomorrow's) systems. Policies and policy based management is a key enabling technology for achieving autonomicity. Described herein is a method that produces fully (mathematically) tractable development of policies for autonomic systems from requirements through to code generation. The use of this method was illustrated through an example showing how user formulated policies can be translated into a formal mode which can then be converted to code. The requirements-based programming method described provides faster, higher quality development and maintenance of autonomic systems based on user formulation of policies.

The systems, method and apparatus described herein provide a way of analyzing policies for autonomic systems and facilitates the generation of provably correct implementations automatically, which in turn provides reduced development time, reduced testing requirements, guarantees of correctness of the implementation with respect to the policies specified at the outset, and provides a higher degree of confidence that the policies are both complete and reasonable. The ability to specify the policy for the management of a system and then automatically generate an equivalent implementation will greatly improve the quality of software, the survivability of future missions, in particular when the system will operate untended in very remote environments, and greatly reduce development lead times and costs.

A system and method for generating scripts from requirements expressed as policies, is described according to an embodiment. In some embodiments, the system and method also allows for "reverse engineering," analysis, and correction of errors found in existing scripts. In some embodiments, the method allows multiple existing scripts to be combined, discrepancies resolved and re-generated as a single script in which confidence can be placed in its correct implementation of the stated requirements (which can be "captured" from the existing implementation).

Although specific embodiments have been illustrated and described herein, it will be appreciated by those of ordinary skill in the art that any arrangement which is calculated to achieve the same purpose can be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In some embodiments, a formal model is generated from the policies. The formal model may then be analyzed for a range of different possible errors in the policies. Additionally, scripts may be generated that correspond to the policies. Since the scripts can be generated automatically, there may be a significantly reduced likelihood of error, and common "programming" errors can be eliminated. These scripts may be in a scripting language such as PERL, BioPerl, PYTHON, etc. or in a language suitable for controlling machines, robots and other devices.

Existing scripts can be combined, analyzed, and regenerated as a single script in the same language, or another language, that increases accuracy and reduces common errors.

In particular, one of skill in the art readily will appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art readily will recognize that embodiments are applicable to future communication devices, different file systems, and new data types.

The terminology used in this application is meant to include all object-oriented, database and communication environments and alternate technologies which provide the same functionality as described herein.

We claim:

1. A computer-accessible medium having executable instructions to generate a system, the executable instructions capable of directing a processor to perform:

receiving at least one policy of the system;

translating the at least one policy of the system to an implementation, and analyzing the formal specification, wherein a policy includes a set of rules or principles that describes constraints on system functionality and prescribes how the system must behave;

wherein translating the at least one policy of the system includes mapping a policy to a specific, single implementation as determined by the syntax and semantics of a policy language, an underlying formal model, and domain knowledge;

wherein an implementation is a set of artifacts that provides a functional instance of the system; and wherein analyzing the formal specification includes interpreting and applying mathematical logic to the formal specification to identify inconsistencies, omissions, redundancies, and errors, including system deadlock, system livelock, and unreachable states, wherein applying mathematical logic includes applying axioms and theorems of mathematics and logic, wherein system deadlock is when at least two executing processes each wait for the other to finish and may continue to do so indefinitely, and wherein system livelock is when at least two executing processes each wait for the other to finish, but their relative internal states change continually during execution without progress being made by either process.

2. The computer-accessible medium of claim 1, wherein the executable instructions further comprise translating the at least one policy of the system to the implementation without using an automated inference engine.

3. The computer-accessible medium of claim 1, wherein the executable instructions further comprise translating the at least one policy of the system to the implementation in reference to an inference engine, wherein an inference engine iteratively applies a set of rules to a set of data representing a problem to determine a solution to the problem by logical manipulation and logical analysis of the data.

4. The computer-accessible medium of claim 1, wherein the executable instructions further comprise translating the at least one policy of the system to a formal specification in reference to an inference engine, wherein translating the at least one policy of the system to a formal specification includes interpreting the syntax and semantics of the policy and matching the syntactically or logically equivalent representations in the formal specification language, and wherein an inference engine iteratively applies a set of rules to a set of data representing a problem to determine a solution to the problem by logical manipulation and logical analysis of the data; and translating the formal specification to an implementation, wherein translating the formal specification to an implementation includes interpreting the syntax and semantics of the formal specification and matching the syntactically or logically equivalent representations in the implementation language.

5. The computer-accessible medium of claim 4, wherein the executable instructions further comprise applying mathematical logic to the formal specification in order to identify a presence or absence of mathematical properties of the at least one policy.

6. The computer-accessible medium of claim 4, the medium further comprising:

executable instructions capable of directing the processor to perform translating the formal specification to at least one policy, wherein translating the formal specification to at least one policy includes interpreting syntax and semantics of the formal specification and matching the syntactically or logically equivalent representation in the at least one policy.

7. The computer-accessible medium of claim 5, the medium further comprising:

executable instructions capable of directing the processor to perform correcting the absence of the mathematical properties in the policy, if the mathematical properties are identified as absent in the policy, wherein correcting includes detecting inconsistencies or other errors in the formal specification and, if possible, identifying a portion of the at least one policy lacking in the detected inconsistencies or other errors and designating the portion as a corrected policy.

8. The computer-accessible medium of claim 5, wherein the mathematical properties of the at least one policy further comprise whether the formal specification implies a system execution trace that includes a deadlock condition;

whether the formal specification implies a system execution trace that includes a livelock condition; and whether the formal specification implies a system execution trace that exhibits or does not exhibit a plurality of other desirable or undesirable behaviors, including safety properties, security properties, unreachable states, inconsistencies, naming conflicts, unused variables, unexecuted code, wherein a deadlock condition is when at least two executing processes each wait for the other to finish and may continue to do so indefinitely, and wherein a livelock condition is when at least two executing processes each wait for the other to finish, but their relative internal states change continually during execution without progress being made by either process.

9. The computer-accessible medium of claim 1, wherein the implementation further comprises:

a script encoded in PERL language.

10. The computer-accessible medium of claim 1, wherein the implementation further comprises:

a script encoded in BIOPERL language.

11. The computer-accessible medium of claim 1, wherein the implementation further comprises:

a script encoded in PYTHON language.

12. The computer-accessible medium of claim 1, wherein the implementation further comprises:

a script encoded in AWK language.

13. A computer-accessible medium having executable instructions to generate a system from at least one policy, the executable instructions capable of directing a processor to perform:

translating the at least one policy to a formal specification;

translating the formal specification to one or more scripts implementing the system, and analyzing the formal specification, wherein a policy includes a set of rules or principles that describes constraints on system functionality and prescribes how the system must behave;

wherein translating the at least one policy to a formal specification includes interpreting syntax and semantics in the policy and matching the syntactically or logically equivalent representations in the formal specification language;

wherein translating the formal specification to one or more scripts implementing the system includes interpreting the expressions composing the formal specification and matching syntactically or logically equivalent representations in the implementation scripting language; and wherein analyzing the formal specification includes interpreting and applying mathematical logic to a formal specification to identify inconsistencies, omissions, redundancies, and errors, including system deadlock, system livelock, and unreachable states, wherein applying mathematical logic includes applying axioms and theorems of mathematics and logic, wherein system deadlock is when at least two executing processes each wait for the other to finish and may continue to do so indefinitely, and wherein system livelock is when at least two executing processes each wait for the other to finish, but their relative internal states change continually during execution without progress being made by either process.

14. The computer-accessible medium of claim 13, wherein the executable instructions further comprise:

verifying the syntax of the at least one policy; and mapping the at least one policy to a plurality of formal specification segments, wherein verifying the syntax includes interpreting and logically analyzing syntax and semantics in the policy to detect and identify violation of predetermined syntax rules and conventions; and wherein mapping includes assigning to the policy a plurality of formal specification segments by using a set of predetermined correspondences.

15. The computer-accessible medium of claim 13, wherein the executable instructions further comprise verifying consistency of the formal specification, wherein verifying consistency includes applying logic, mathematical laws, and domain knowledge encoded in the system to detect and identify logical and mathematical inconsistencies in the formal specification.

16. The computer-accessible medium of claim 13, the medium further comprising executable instructions capable of directing the processor to perform:

determining mathematical and logical properties of the formal specification by an automated inference engine, wherein an inference engine iteratively applies a set of rules to a set of data representing a problem to determine a solution to the problem by logical manipulation and logical analysis of the data.

17. The computer-accessible medium of claim 13, wherein the executable instructions further comprise:
- translating the at least one policy to a separate formal specification without using an automated inference engine, wherein translating the at least one policy of the system to a formal specification includes interpreting the syntax and semantics of the policy and matching the syntactically or logically equivalent representation in the formal specification language, and wherein an inference engine iteratively applies a set of rules to a set of data representing a problem to determine a solution to the problem by logical manipulation and logical analysis of the data.

18. The computer-accessible medium of claim 13, wherein the script further comprises:
- a script encoded in PERL language.

19. The computer-accessible medium of claim 13, wherein the script further comprises:
- a script encoded in AWK language.

20. The computer-accessible medium of claim 13, wherein the script further comprises:
- a script encoded in PYTHON language.

21. A system to validate a software system, the system comprising:
- an inference engine, wherein an inference engine iteratively applies a set of rules to a set of data representing a problem to determine a solution to the problem by logical manipulation and logical analysis of the data;
- a translator, operable to receive at least one policy of the software system and to generate in reference to the inference engine a specification encoded in a formal specification language, wherein a policy includes a set of rules or principles that describes constraints on system functionality and prescribes how the system must behave; and
- an analyzer operable to perform model verification/checking and determine existence of omissions, deadlock, livelock, and race conditions or other problems and inconsistencies in the formal specification, wherein a deadlock condition is when at least two executing processes each wait for the other to finish and may continue to do so indefinitely, wherein a livelock condition is when at least two executing processes each wait for the other to finish, but their relative internal states change continually during execution without progress being made by either process, and wherein race condition is when progress of at least two separate processes is each dependent upon the state of another part of the system in such way that a first process can alter that state before the second process alters the state.

22. The system of claim 21, wherein the translation of the at least one policy into a specification is carried out without human intervention.

23. A computer-accessible medium having executable instructions to validate a system, the executable instructions capable of directing a processor to perform:
- receiving at least one policy of the system, wherein a policy includes a set of rules or principles that describes constraints on system functionality and prescribes how the system must behave;
- translating the at least one policy of the system to a formal specification, wherein translating the at least one policy of the system to a formal specification includes interpreting the syntax and semantics of the policy and matching the syntactically or logically equivalent representation in the formal specification language, and wherein an inference engine iteratively applies a set of rules to a set of data representing a problem to determine a solution to the problem by logical manipulation and logical analysis of the data;
- translating the formal specification to an implementation, wherein translating the formal specification to an implementation includes interpreting the sequence of the syntax and semantics of a formal specification language and matching the syntactically or logically equivalent representations in the implementation language and wherein an implementation is a set of artifacts that provides a functional instance of the system; and
- analyzing the formal specification, wherein analyzing the formal specification includes interpreting and applying mathematical logic to a formal specification to identify inconsistencies, omissions, redundancies, and errors, including system deadlock, system livelock, and unreachable states, wherein applying mathematical logic includes applying axioms and theorems of mathematics and logic, wherein system deadlock is when at least two executing processes each wait for the other to finish and may continue to do so indefinitely, and wherein system livelock is when at least two executing processes each wait for the other to finish, but their relative internal states change continually during execution without progress being made by either process.

24. The computer-accessible medium of claim 23, wherein the executable instructions further comprise:
- translating the at least one policy of the system to the formal specification, without the use of an automated inference engine, wherein an inference engine iteratively applies a set of rules to a set of data representing a problem to determine a solution to the problem by logical manipulation and logical analysis of the data.

25. The computer-accessible medium of claim 23, wherein the executable instructions further comprise:
- translating the at least one policy of the system to the formal specification, in reference to an inference engine, wherein an inference engine iteratively applies a set of rules to a set of data representing a problem to determine a solution to the problem by logical manipulation and logical analysis of the data.

26. The computer-accessible medium of claim 23, wherein the executable instructions further comprise
- applying mathematical logic to the formal specification in order to identify a presence or absence of mathematical properties of the at least one policy.

27. The computer-accessible medium of claim 26, wherein the mathematical properties of the formal specification further comprise:
- whether the formal specification implies a system execution trace that includes a deadlock condition;
- whether the formal specification implies a system execution trace that includes a livelock condition; and
- whether the formal specification implies a system execution trace that exhibits or does not exhibit a plurality of other desirable or undesirable behaviors, including safety properties, security properties, unreachable states, inconsistencies, naming conflicts, unused variables, and unexecuted code,
- wherein a deadlock condition is when at least two executing processes each wait for the other to finish and may continue to do so indefinitely, and wherein a livelock condition is when at least two executing processes each wait for the other to finish, but their relative internal states change continually during execution without progress being made by either process.

28. The computer-accessible medium of claim 23, wherein the implementation further comprises:
a script encoded in PERL language.

29. The computer-accessible medium of claim 23, wherein the implementation further comprises:
a script encoded in BIOPERL language.

30. The computer-accessible medium of claim 23, wherein the implementation further comprises:
a script encoded in PYTHON language.

31. The computer-accessible medium of claim 23, wherein the implementation further comprises:
a script encoded in AWK language.

32. The computer-accessible medium of claim 23, the medium further comprising:
executable instructions capable of directing the processor to perform translating the implementation to a formal specification, wherein translating the implementation to a formal specification includes interpreting an implementation language and matching the syntactically or logically equivalent representations of the formal specification; and
translating the formal specification to at least one policy, wherein translating the formal specification to at least one policy includes interpreting syntax and semantics of the formal specification and matching the syntactically or logically equivalent representations in the at least one policy.

33. A computer-accessible medium having executable instructions to validate a system, the executable instructions capable of directing a processor to perform:
receiving a formal specification of the system;
translating the formal specification to an implementation, wherein translating the formal specification to an implementation includes interpreting the syntax and semantics of a formal specification language and matching the syntactically or logically equivalent representations in the implementation language and wherein an implementation is a set of software that provides a functional instance of the system; and
analyzing the formal specification, wherein analyzing the formal specification includes interpreting and applying mathematical logic to a formal specification to identify inconsistencies, omissions, redundancies, and errors, including system deadlock, system livelock, and unreachable states, wherein applying mathematical logic includes applying axioms and theorems of mathematics and logic, wherein system deadlock is when at least two executing processes each wait for the other to finish and may continue to do so indefinitely, and wherein system livelock is when at least two executing processes each wait for the other to finish, but their relative internal states change continually during execution without progress being made by either process.

34. The computer-accessible medium of claim 33, wherein the executable instructions further comprise
applying mathematical logic to the formal specification in order to identify a presence or absence of mathematical properties of the implementation.

35. The computer-accessible medium of claim 34, wherein the mathematical properties of the formal specification further comprise:
whether the formal specification implies a system execution trace that includes a deadlock condition;
whether the formal specification implies a system execution trace that includes a livelock condition; and
whether the formal specification implies a system execution trace that exhibits or does not exhibit a plurality of other desirable or undesirable behaviors including safety properties, security properties, unreachable states, inconsistencies, naming conflicts, unused variables, unexecuted code,
wherein a deadlock condition is when at least two executing processes each wait for the other to finish and may continue to do so indefinitely, and wherein a livelock condition is when at least two executing processes each wait for the other to finish, but their relative internal states change continually during execution without progress being made by either process.

36. The computer-accessible medium of claim 33, the medium further comprising executable instructions capable of directing the processor to perform
translating the formal specification to at least one policy, wherein translating the formal specification to at least one policy includes interpreting syntax and semantics of the formal specification and matching the syntactically or logically equivalent representations in the at least one policy.

37. The computer-accessible medium of claim 33, wherein the implementation further comprises:
a script encoded in PERL language.

38. The computer-accessible medium of claim 33, wherein the implementation further comprises:
a script encoded in BIOPERL language.

39. The computer-accessible medium of claim 33, wherein the implementation further comprises:
a script encoded in PYTHON language.

40. The computer-accessible medium of claim 33, wherein the implementation further comprises:
a script encoded in AWK language.

41. A computer-accessible medium having executable instructions to validate a system, the executable instructions capable of directing a processor to perform
receiving an implementation of the system, wherein an implementation is a set of artifacts that provides a functional instance of the system;
translating the implementation to a formal specification, wherein translating the implementation to a formal specification includes interpreting an implementation language and matching the syntactically or logically equivalent representations of the format specification; and
analyzing the formal specification, wherein analyzing the formal specification includes interpreting and applying mathematical logic to a formal specification to identify inconsistencies, omissions, redundancies, and errors, including system deadlock, system livelock, and unreachable states, wherein applying mathematical logic includes applying axioms and theorems of mathematics and logic, wherein system deadlock is when at least two executing processes each wait for the other to finish and may continue to do so indefinitely, and wherein system livelock is when at least two executing processes each wait for the other to finish, but their relative internal states change continually during execution without progress being made by either process.

42. The computer-accessible medium of claim 41, wherein the executable instructions further comprise
applying mathematical logic to the formal specification in order to identify a presence or absence of mathematical properties of the specification.

43. The computer-accessible medium of claim 42, wherein the mathematical properties of the formal specification further comprise:

whether the formal specification implies a system execution trace that includes a deadlock condition;
whether the formal specification implies a system execution trace that includes a livelock condition; and
whether the formal specification implies a system execution trace that exhibits or does not exhibit a plurality of other desirable or undesirable behaviors including safety properties, security properties, unreachable states, inconsistencies, naming conflicts, unused variables, unexecuted code,
wherein a deadlock condition is when at least two executing processes each wait for the other to finish and may continue to do so indefinitely, and wherein a livelock condition is when at least two executing processes each wait for the other to finish, but their relative internal states change continually during execution without progress being made by either process.

44. The computer-accessible medium of claim 41, wherein the implementation further comprises:
a script encoded in PERL language.

45. The computer-accessible medium of claim 41, wherein the implementation further comprises:
a script encoded in BIOPERL language.

46. The computer-accessible medium of claim 41, wherein the implementation further comprises:
a script encoded in PYTHON language.

47. The computer-accessible medium of claim 41, wherein the implementation further comprises:
a script encoded in AWK language.

48. A computer-accessible medium having executable instructions to validate a system, the executable instructions capable of directing a processor to perform:
receiving a formal specification of the system;
translating the formal specification to at least one policy, wherein translating the formal specification to at least one policy includes interpreting syntax and semantics of the formal specification and matching the syntactically or logically equivalent representations in the at least one policy and wherein a policy includes a set of rules or principles that describes constraints on system functionality and prescribes how the system must behave; and
analyzing the formal specification, wherein analyzing the formal specification includes interpreting and applying mathematical logic to a formal specification to identify inconsistencies, omissions, redundancies, and errors, including system deadlock, system livelock, and unreachable states, wherein applying mathematical logic includes applying axioms and theorems of mathematics and logic, wherein system deadlock is when at least two executing processes each wait for the other to finish and may continue to do so indefinitely, and wherein system livelock is when at least two executing processes each wait for the other to finish, but their relative internal states change continually during execution without progress being made by either process.

49. The computer-accessible medium of claim 48, wherein the executable instructions further comprise
applying mathematical logic to the formal specification in order to identify a presence or absence of mathematical properties of the formal specification.

50. The computer-accessible medium of claim 49, wherein the mathematical properties of the formal specification further comprise:
whether the formal specification implies a system execution trace that includes a deadlock condition;
whether the formal specification implies a system execution trace that includes a livelock condition; and
whether the formal specification implies a system execution trace that exhibits or does not exhibit a plurality of other desirable or undesirable behaviors including safety properties, security properties, unreachable states, inconsistencies, naming conflicts, unused variables, unexecuted code,
wherein a deadlock condition is when at least two executing processes each wait for the other to finish and may continue to do so indefinitely, and wherein a livelock condition is when at least two executing processes each wait for the other to finish, but their relative internal states change continually during execution without progress being made by either process.

51. A computer-accessible medium having executable instructions to validate a system, the executable instructions capable of directing a processor to perform:
translating a plurality of policies to a plurality of formal specifications; combining the plurality of formal specifications to a singular formal specification, wherein combining the plurality of formal specifications to a singular formal specification includes using mathematical logic to produce a single logical equivalent of the plurality of formal specifications in a sequence of formal-specification-language expressions from another sequence of formal-specification-language expressions, and wherein a policy includes a set of rules or principles that describes constraints on system functionality and prescribes how the system must behave;
analyzing the singular formal specification, wherein analyzing the formal specification includes interpreting and applying mathematical logic to a formal specification to identify inconsistencies, omissions, redundancies, and errors, including system deadlock, system livelock, and unreachable states, wherein applying mathematical logic includes applying axioms and theorems of mathematics and logic, wherein system deadlock is when at least two executing processes each wait for the other to finish and may continue to do so indefinitely, and wherein system livelock is when at least two executing processes each wait for the other to finish, but their relative internal states change continually during execution without progress being made by either process;
correcting absence of the mathematical properties in the singular formal specification, wherein correcting includes detecting inconsistencies or other errors in the formal specification and replacing the inconsistencies or errors with the correct property or properties; and
translating the formal specification to a policy, wherein translating the formal specification to a policy includes interpreting syntax and semantics of the formal specification and matching the syntactically or logically equivalent representations in the policy.

52. The computer-accessible medium of claim 51, wherein the executable instructions further comprise
applying mathematical logic to the singular formal specification in order to identify a presence or absence of mathematical properties of the singular formal specification.

53. The computer-accessible medium of claim 52, wherein the mathematical properties of the singular formal specification further comprise:
whether the singular formal specification implies a system execution trace that includes a deadlock condition;
whether the singular formal specification implies a system execution trace that includes a livelock condition; and whether the singular formal specification implies a system execution trace that exhibits or does not exhibit a plurality of other desirable or undesirable behaviors, wherein a deadlock condition is when at least two executing processes each wait for the other to finish and may continue to do so indefinitely, and wherein a livelock condition is when at least two executing processes each wait for the other to finish, but their relative internal states change continually during execution without progress being made by either process.

54. The computer-accessible medium of claim 53, wherein the desirable or undesirable behaviors is taken from the list consisting essentially of safety properties, security properties, unreachable states, inconsistencies, running conflicts, unused variables, and unexecuted code.

* * * * *